US012639431B2

(12) United States Patent
Mooney, III

(10) Patent No.: US 12,639,431 B2
(45) Date of Patent: May 26, 2026

(54) AUTOMATED THREAT MODEL GENERATION

(71) Applicant: Robert J. Mooney, III, Mercer Island, WA (US)

(72) Inventor: Robert J. Mooney, III, Mercer Island, WA (US)

(*) Notice: Subject to any disclaimer, the term of this patent is extended or adjusted under 35 U.S.C. 154(b) by 0 days.

(21) Appl. No.: 18/759,286

(22) Filed: Jun. 28, 2024

(65) Prior Publication Data

US 2024/0354408 A1      Oct. 24, 2024

Related U.S. Application Data

(63) Continuation of application No. 17/566,609, filed on Dec. 30, 2021, now Pat. No. 12,050,685.

(60) Provisional application No. 63/132,317, filed on Dec. 30, 2020.

(51) Int. Cl.
G06F 21/56          (2013.01)

(52) U.S. Cl.
CPC .......... G06F 21/563 (2013.01); G06F 21/566 (2013.01)

(58) Field of Classification Search
CPC ................ G06F 21/563; G06F 21/566; G06F 2221/033; G06F 21/6245; G06F 21/577
See application file for complete search history.

(56) References Cited

U.S. PATENT DOCUMENTS

| | | | | |
|---|---|---|---|---|
| 7,891,003 B2 * | 2/2011 | Mir | ......................... | G06Q 10/06 |
| | | | | 726/25 |
| 8,887,286 B2 * | 11/2014 | Dupont | ................... | G06F 21/50 |
| | | | | 726/25 |
| 9,516,053 B1 * | 12/2016 | Muddu | ................ | G06V 10/225 |
| 11,323,464 B2 * | 5/2022 | Jakobsson | ........... | H04L 63/1425 |
| 2017/0103674 A1 * | 4/2017 | Sadeh-Koniecpol | ....................... | |
| | | | | G06F 21/566 |

* cited by examiner

*Primary Examiner* — Sm A Rahman
(74) *Attorney, Agent, or Firm* — Heslin Rothenberg Farley & Mesiti P.C.

(57)          ABSTRACT

Embodiments of the present invention include computer-implemented methods, systems, and computer program products where program code executing on a processor(s) obtains an artifact of a given computing system. The program code determines a type for the artifact. The program code designates a given analysis tool from a plurality of analysis tools, to process the artifact. The program code processes the artifact by utilizing the given analysis tool, to determine facts of the artifact. The program code determines which facts of the one or more facts comprise elements of a threat model. The program code stores the elements of the threat model and the facts. The program code generates a threat model for the given computing system, based on consolidating the elements of the threat model for the artifact with additional elements of the threat models of additional artifacts.

19 Claims, 8 Drawing Sheets

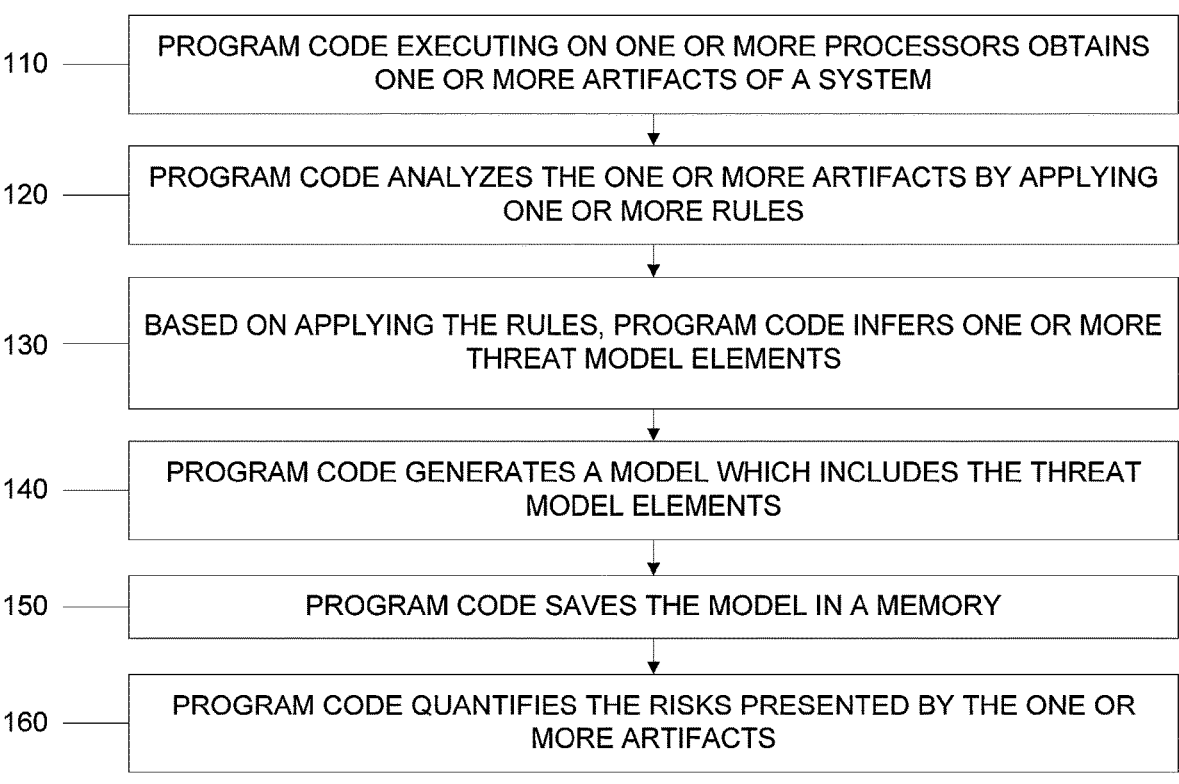

100

110 — PROGRAM CODE EXECUTING ON ONE OR MORE PROCESSORS OBTAINS ONE OR MORE ARTIFACTS OF A SYSTEM

120 — PROGRAM CODE ANALYZES THE ONE OR MORE ARTIFACTS BY APPLYING ONE OR MORE RULES

130 — BASED ON APPLYING THE RULES, PROGRAM CODE INFERS ONE OR MORE THREAT MODEL ELEMENTS

140 — PROGRAM CODE GENERATES A MODEL WHICH INCLUDES THE THREAT MODEL ELEMENTS

150 — PROGRAM CODE SAVES THE MODEL IN A MEMORY

160 — PROGRAM CODE QUANTIFIES THE RISKS PRESENTED BY THE ONE OR MORE ARTIFACTS

FIG. 1

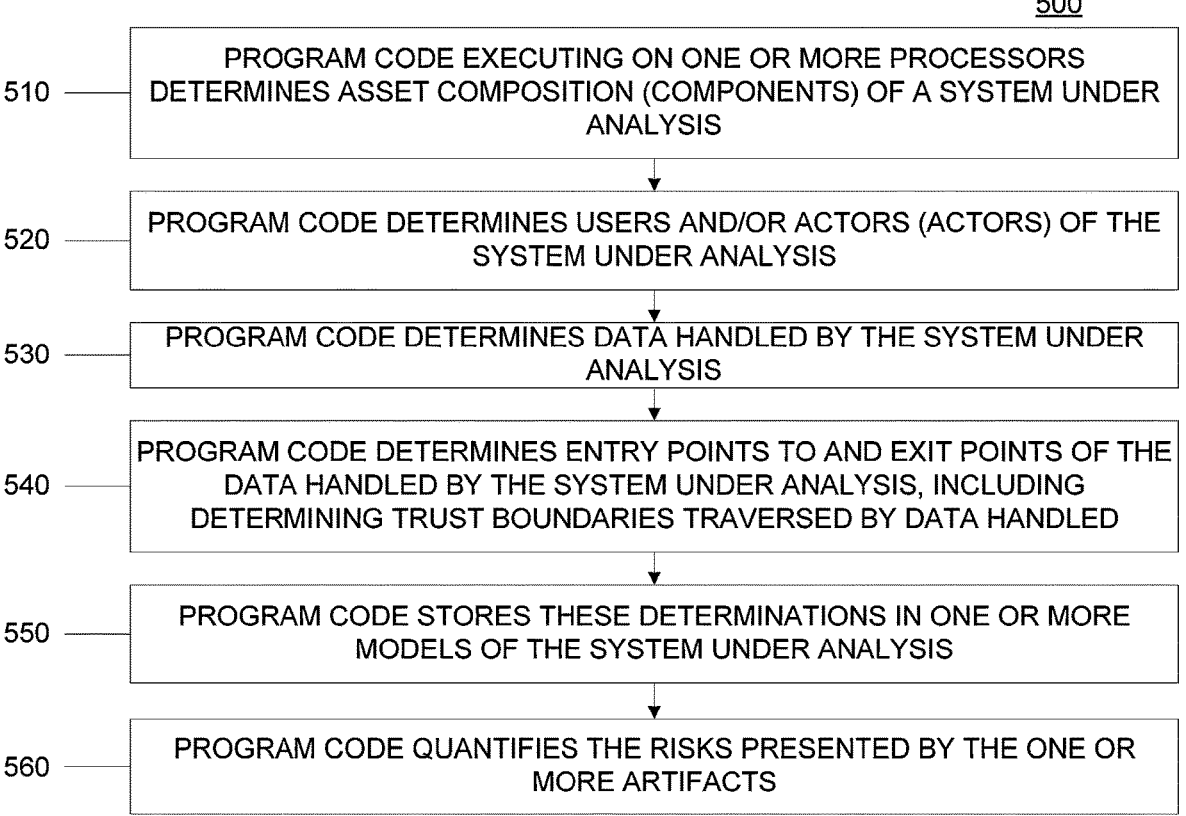

<u>500</u>

510 — PROGRAM CODE EXECUTING ON ONE OR MORE PROCESSORS DETERMINES ASSET COMPOSITION (COMPONENTS) OF A SYSTEM UNDER ANALYSIS

520 — PROGRAM CODE DETERMINES USERS AND/OR ACTORS (ACTORS) OF THE SYSTEM UNDER ANALYSIS

530 — PROGRAM CODE DETERMINES DATA HANDLED BY THE SYSTEM UNDER ANALYSIS

540 — PROGRAM CODE DETERMINES ENTRY POINTS TO AND EXIT POINTS OF THE DATA HANDLED BY THE SYSTEM UNDER ANALYSIS, INCLUDING DETERMINING TRUST BOUNDARIES TRAVERSED BY DATA HANDLED

550 — PROGRAM CODE STORES THESE DETERMINATIONS IN ONE OR MORE MODELS OF THE SYSTEM UNDER ANALYSIS

560 — PROGRAM CODE QUANTIFIES THE RISKS PRESENTED BY THE ONE OR MORE ARTIFACTS

FIG. 5

AUTOMATED THREAT MODEL GENERATION

CROSS REFERENCE TO RELATED APPLICATIONS

This application claims priority from U.S. Non-Provisional patent application Ser. No. 17/566,609, filed Dec. 30, 2021, entitled "AUTOMATED THREAT MODEL GENERATION," which claims priority from provisional patent application No. 63/132,317, filed Dec. 30, 2020, entitled, "System and method for the automatic generation of a computer security model," which is hereby incorporated herein by reference in its entirety for all purposes.

BACKGROUND OF INVENTION

The threat modeling of the elements of a computing system is a structured process with the objectives of: identifying security requirements, pinpointing security threats and potential vulnerabilities, quantifying threat and vulnerability criticality, and/or prioritizing remediation methods. Threat modeling works by identifying the types of threat agents that cause harm to an application or computer system. It adopts the perspective of malicious hackers to see how much damage they could do. Threat modeling provides information security analysts, system administrators, and/or developers with a deeper understanding and discovery of important aspects of a computing system. By threat modeling an element of a computing system, an observer can generate an abstraction of the computing system, profiles of potential attackers, including their goals and methods, and/ or a catalog of threats that could arise.

Threat modeling can be a useful tool in system security. When conducting threat modeling, organizations perform a thorough analysis of the software architecture, business context, and other artifacts (e.g., functional specifications, user documentation). Typically, organizations conduct threat modeling during the design stage (but it can occur at other stages) of a new application to help developers find vulnerabilities and become aware of the security implications of their design, code, and configuration decisions. Generally, developers perform threat modeling by diagraming a system element, identifying the threats (what could go wrong), mitigating the threats, and validating that the mitigation measures will address the threats.

SUMMARY OF INVENTION

Shortcomings of the prior art are overcome, and additional advantages are provided through the provision of a system for assessing security in a computing system. The system includes: a memory; the one or more processors in communication with the memory; program instructions executable by the one or more processors to perform a method, the method comprising: obtaining, by the one or more processors, an artifact of a given computing system; determining, by the one or more processors, based on applying rules, a type for the artifact; based on the type, designating, by the one or more processors, a given analysis tool from a plurality of analysis tools, to process the artifact; processing, by the one or more processors, the artifact, utilizing the given analysis tool, to determine facts of the artifact; determining, by the one or more processors, which facts of the one or more facts comprise elements of a threat model; storing, by the one or more processors, the elements of the threat model and the facts; and generating, by the one or more processors, a threat model for the given computing system, based on consolidating the elements of the threat model for the artifact with additional elements of the threat models of additional artifacts.

Shortcomings of the prior art are also overcome, and additional advantages are provided through the provision of a method for assessing and addressing threats in a computing system. The method includes: obtaining, by the one or more processors, an artifact of a given computing system; determining, by the one or more processors, based on applying rules, a type for the artifact; based on the type, designating, by the one or more processors, a given analysis tool from a plurality of analysis tools, to process the artifact; processing, by the one or more processors, the artifact, utilizing the given analysis tool, to determine facts of the artifact; determining, by the one or more processors, which facts of the one or more facts comprise elements of a threat model; storing, by the one or more processors, the elements of the threat model and the facts; and generating, by the one or more processors, a threat model for the given computing system, based on consolidating the elements of the threat model for the artifact with additional elements of the threat models of additional artifacts.

Shortcomings of the prior art are also overcome, and additional advantages are provided through the provision of a computer program product for assessing and addressing threats in a computing system. The computer program product includes a computer readable storage medium readable by one or more processors and storing instructions for execution by the one or more processors for performing a method comprising: obtaining, by the one or more processors, an artifact of a given computing system; determining, by the one or more processors, based on applying rules, a type for the artifact; based on the type, designating, by the one or more processors, a given analysis tool from a plurality of analysis tools, to process the artifact; processing, by the one or more processors, the artifact, utilizing the given analysis tool, to determine facts of the artifact; determining, by the one or more processors, which facts of the one or more facts comprise elements of a threat model; storing, by the one or more processors, the elements of the threat model and the facts; and generating, by the one or more processors, a threat model for the given computing system, based on consolidating the elements of the threat model for the artifact with additional elements of the threat models of additional artifacts.

Systems, computer program products, and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 1 depicts an example of a workflow that illustrates various aspects of some embodiments of the present invention.

FIG. 5 depicts an example of a workflow that illustrates various aspects of some embodiments of the present invention.

DETAILED DESCRIPTION OF THE INVENTION

Figure 2:
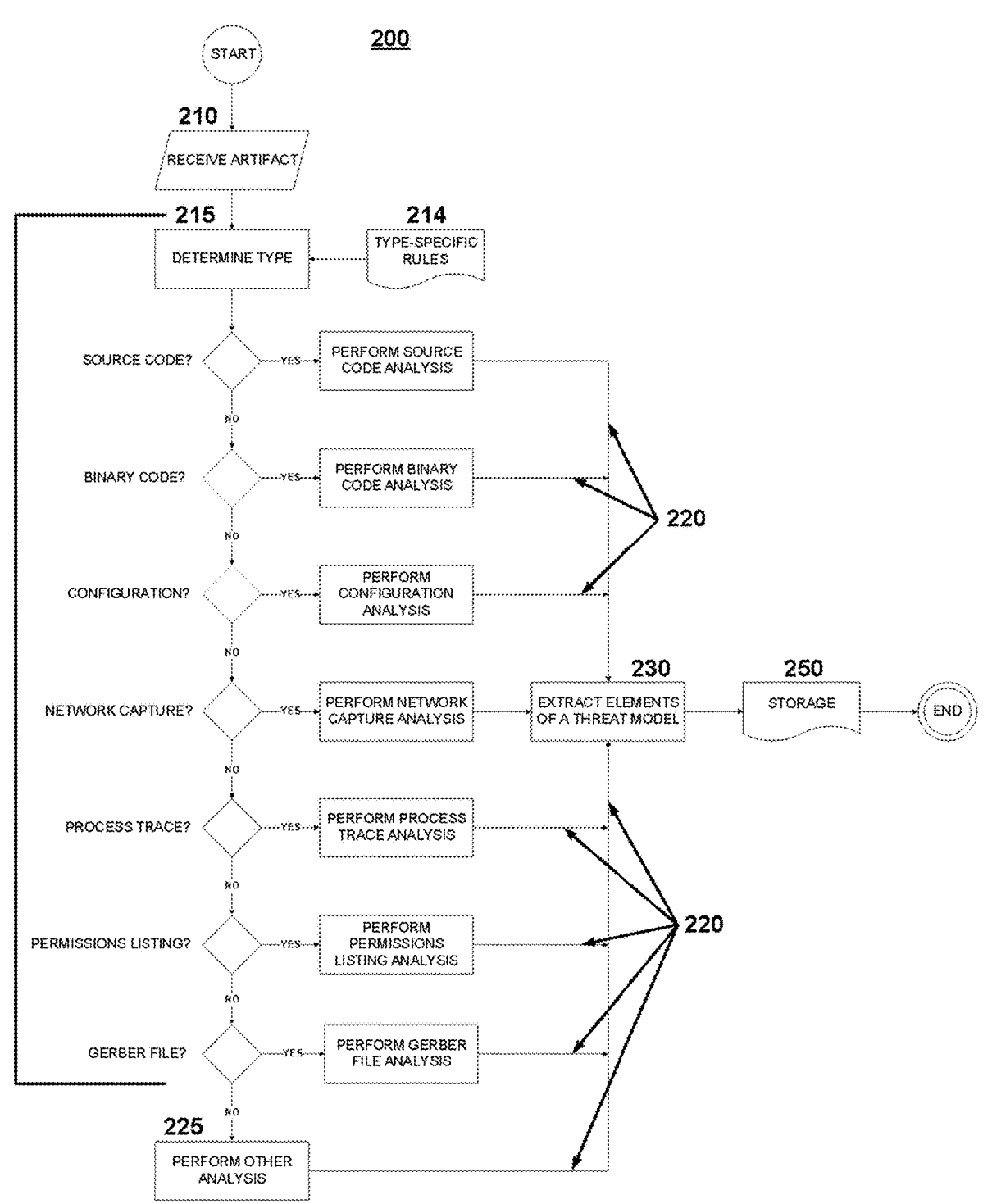
FIG. 2 depicts an example of a workflow that illustrates various aspects of some embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, a GPP (general purpose processor), an FPGA (field-programmable gate array), and a GPU (graphics processing unit). Additionally, items denoted as processors may include hardware and/or software processors or other processing means, including but not limited to a software defined radio and/or custom hardware.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "including" and "comprising", as used herein, mean the same thing.

The terms "substantially", "approximately", "about", "relatively", or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. If used herein, the terms "substantially", "approximately", "about", "relatively," or other such similar terms may also refer to no fluctuations, that is, ±0%.

As used herein, "electrically coupled" and "optically coupled" refers to a transfer of electrical energy and light waves, respectively, between any combination of a power source, an electrode, a conductive portion of a substrate, a droplet, a conductive trace, wire, waveguide, nanostructures, other circuit segment and the like. The terms electrically coupled and optically coupled may be utilized in connection with direct or indirect connections and may pass through various intermediaries, such as a fluid intermediary, an air gap and the like.

As used herein, the terms "security sensitive code" and "privacy sensitive code" are used interchangeably.

As used herein, the term "system under analysis" refers to a computer system to which a provided artifact belongs.

As used here, the terms "threat model" and "security model" are used interchangeably.

As used herein, the elements including but not limited to the asset composition ("components") of a system, users and/or actors ("actors") of the system, data handled by the system, entry points to and exit points of the data handled by the system, trust boundaries traversed by data in the system, dependencies within the system, and roles within the system are refereed to elements of a threat model. In a software system, components may include but are not limited to software packages, Web services, resources, or modules which encapsulate a set of related functions or data. Components which interact with each typically use a common interface and are considered connected by at least one data flow. In an electrical system, components may include but are not limited to electronic circuits, electrical components, or schematics.

As used herein, the term "entry point" is a location in an artifact where a first instructions of source code or logic (source code or logic hereafter referred to as code) of a component are executed. An entry point can be defined by an application binary interface (ABI), application programming interface (API), or any other like interface of an execution environment.

As used herein, the term "trust boundary" delineates a region of trust between components. On one side of the boundary, data is believed to be trusted. On the other side of the boundary, the same data is believed to be untrusted. Trust boundaries represent a change in policy which typically includes distinct requirements for data to be considered trusted.

As used herein, the term "fact" is a truth identified by program code executing on one or more processors in various embodiments of the present invention and/or or provided to program code describing one or more elements of a system under analysis (the system being analyzed by the program code from which the artifacts analyzed by the program code originate).

As used here, the term "role" represents a function or part performed (especially in a particular operation or process) discovered by the present system or method of an element of a threat model.

As used herein, the term "dependency" describes a component of a system that is used by the system under analysis.

The examples described herein comprise a system, method, and computer program product for identifying elements of a threat model in artifacts of a computer system. The program code in embodiments of the present invention utilizes these elements to identify and enumerate security and privacy threats to the system as a whole. Generally, threat modeling is a process by which potential threats (including but not limited to a design flaw, an implementation error, or the absence of appropriate safeguards) can be identified, enumerated, and their mitigations prioritized. Threat modeling typically involves the creation of a threat model. As notes above, in the context of the present invention, a threat model is comprised of elements including but not limited to, components of a system, users of the system, data handled by the system, entry points to and exit points of the data handled by the system, trust boundaries traversed by data in the system, dependencies between elements in the system between each other and between external elements, and roles within the system. In embodiments of the present invention, various analyzers that analyze different types of artifacts are utilized by the program code to produce one or more models of the system containing threat model elements which are consolidated and stored in a threat model for the system, as a whole. The program code can store the generated threat model on a computer-readable storage medium. In some embodiments of the present invention, the program code automatically generates notifications based on the threat model and registers these notifications with a communication bus.

In general, accurate, holistic modeling of privacy and security threats to a system is a manual, time consuming, and error-prone process. When utilizing existing approaches to generate a threat model, the model which results from the modeling process, the threat model, is only as accurate as the understanding of the threats by the practitioners involved. The accuracy of a threat model tends to decay over time as the implementation of the system evolves. This increases the cost of performing an effective attack surface analysis and can lead to errors or gaps in threat mitigation due to insufficient representation of threats in the model. This can render a system vulnerable to attack. It is therefore desirable to have a computer-implemented process which aides in the generation of a threat model by providing facts and inferences identified from evidence in a system under analysis. These facts and inferences can be analyzed by an internal system and/or by an external system (for example, to trigger an automated response), and/or provided to human analysts for consideration with the model understood by the analyst.

Disclosed herein are examples of a computer-implemented method, a computer program product, and a computer system that include program code that automatically generates a computer security model. To this end, embodiments of the present invention include the computer-implemented method, computer program products, and computer systems that automatically detect threat model elements of an artifact. As will be described herein, program code executing of one or more processors obtains an artifact of a computing system, identifies the type of the artifact, analyzes the artifact based on the type, identifies one or more elements of a threat model, and stores the one or more elements. Threat models can comprise elements including, but not limited to, components, actors, data, data flows, boundaries, dependencies, roles, and/or risks of the artifact from the artifact. Artifacts can include various elements of computing systems, including but not limited to, structured or unstructured input of a document, a stream, an image, and/or metadata pertaining to a system. If the artifact is structured or unstructured input of a document, the document it can include, but is not limited to, configuration (e.g., source code management commit history and associated properties, including but not limited to, those provided by the git SCM), inventories (e.g., DNS entries, host lists, and/or other asset inventories), source code, intermediate files (e.g., object files, compiled code, byte code, and/or build logs), executable files, instructions, build files, log files, tool output, process traces, instrumentation data, communication bus captures (e.g., network captures), memory captures, bill of materials, schemas, schematics, and/or layout files. If the artifact is a stream, the stream can include data (e.g., network or other communication bus data, instrumentation data, and/or other signals sent to or from a component as it is produced). In examples where the artifact is metadata, the artifact can include, but is not limited to, file-system permissions, host operating characteristics, parameters, design elements, layouts, and/or other configuration or declarations. An artifact of a system architecture may include a network packet capture or a stream of network traffic. In some examples, the program code can perform one or more or a static or dynamic analysis. In some examples, the program code identifies one or more elements of a threat model at least in part by correlating the one or more elements with one or more elements of a threat model previously identified. In some examples, the program code obtains correlated threat model elements as an artifact of a computing system.

Embodiments of the present invention are inextricably tied to computing and are directed to a practical application. Computing security is an issue unique to computing as is the determination and mitigation of any issues in a computing system that create security threats. As computing systems become physically larger and distributed over larger environments with more resources, including but not limited to cloud computing systems, threat determination and mitigation can become more complex and thus, the timing of these determinations and computing utilized in these determinations can be less effective as the complexity and size of systems increase. The examples herein utilize individual artifacts to determine threats relevant to the system, as a whole, and to generate a threat model, which the program code can utilize to mitigate the threats included in this threat model, to improve the security of the computing system as a whole. These artifacts, the threat model, and the processes described herein to generate the threat model are inextricably linked to computing. Furthermore, generating a threat model utilizing individual artifacts and automatically mitigating these threats is a practical application and improves the security and therefore, the functionality, of computing systems in which aspects of embodiments of the present invention are implemented.

Embodiments of the present invention provide significantly more than existing approaches to threat modeling because the examples described herein provide an auto-mated holistic view of the realized state of the element of a threat model in a system architecture. The system architecture represents the structures, behaviors, and views of a system. It is comprised of one or more components represented by artifacts (also referred to as assets) of its implementation. For example, artifacts of a system may include structured or unstructured input from documents, streams, or metadata pertaining to a system. Program code in embodiments of the present invention provides functionality that enables an analyst to understand and address the threats to a computing system architecture by viewing the computer system architecture holistically. The holistic view generated by the program code provides the analyst with data representing an actual (current) state of the system under analysis. Some existing approaches are largely manual because they require the manual responses to questionnaires or the manual definition of the components of a system architecture. Other largely manual approaches require the manual definition of the elements of a threat model either programmatically or through a user interface. Other existing approaches fail to provide an automated holistic view because they focus exclusively on certain elements of system infrastructure and neglect other elements. For examples, some existing approaches not only require well-defined and easily parsed infrastructure configuration files extracted from well-known providers to generate threat models, the existing approaches also focus exclusively on threats related to internet infrastructure, rather than on-premises configurations, excluding potential elements that could impact system security, including but not limited to, network packet captures, source code, and/or program behavior. Other existing approaches model only a possible attack execution path of an application but do not identify threats in the context of data flow through an application or a network architecture. Among limited existing approaches are those that focus on access controls or executable elements exclusively and do not operate in environments with more than a single application, network flow, or application trace log or consider that other artifacts of a system architecture including, but not limited to, source code or the state of the system hosting the application. Another limited existing approach focuses on the security impacts of the threats contained within a model and does not address the privacy-related impacts.

The examples described herein provide functionality that is not available in existing approaches. Specifically, in embodiments of the present invention the program code automatically generates a holistic representation of a system architecture based on visualizing elements of a threat model. As will be described herein, program code in certain of the examples herein provides automatic threat modeling and automatically identifies trust boundaries and can generate visual and/or non-visual representations for these trust boundaries. Additionally, in embodiments of the present invention automatically enables elements of a threat model to be represented in code once the program code has identified these elements. Program code in some embodiments of the present invention obtains metadata from artifacts of a system and based on analyzing the metadata, the program code can determine telemetry based on the current state of the analysis of a threat model, determine health criteria upon which to alert, and/or the collect and/or communicate business or functional metrics related to the modeled architectures. These metadata may include, but are not limited to, file-system permissions, host operating characteristics, parameters, design elements, schematics, layouts, or other configuration or declarations. Embodiments of the present invention also improve upon existing approaches by recognizing temporal changes to security concerns by providing automatic threat modeling provide support for identifying changes between models or changes in threats to a model between revisions of artifacts of a system architecture.

In some examples disclosed herein, program code executing on one or more processors automatically identifies security and privacy-related attributes it discovers in an architecture. The program code automatically infers threat model elements from one or more artifacts of a system architecture to be analyzed referred to herein as a system under analysis. FIG. 1 is a workflow 100 that illustrates various aspects of some embodiments of the present invention. This workflow 100 can be implemented in various technical architectures, including but not limited to one or more of a continuous integration system, an on-premises or cloud-based analysis system, and/or a distributed system where various aspects are distributed over various resources. The technical architecture into which elements of some embodiments of the present invention can be integrated include one or more interface (e.g., a graphical user interface, an application programming interface, a system interface), a communication bus, one or more analysis components, one or more rules to direct the operation of each of the analysis components, and a computer-readable storage medium. The computer-readable storage medium can store instructions comprising program code executed by one or more processors in the technical architecture.

As illustrated in FIG. 1, program code executing on one or more processors obtains one or more artifacts of a system (110). In some embodiments of the present invention, the program code obtains the one or more artifacts via an interface to the system from which the artifact originates, including but not limited to an application programming interface (API) and/or other communication interface. Artifacts can include, but are not limited to, a source code corpus and/or a network packet capture. An artifact of a system architecture obtained by the program code can also include one or more of structured or unstructured input from a document (e.g., configuration, inventories (DNS entries, host lists, or other asset inventories), source code, intermediate files (such as object files, compiled code, byte code, build logs), executable files, build files, log files, tool output, process traces, instrumentation logs, communication bus captures (such as network captures), memory captures, etc.), stream (e.g., network or other communication bus data or instrumentation data sent to or from a component as it is produced, incremental updates to the artifact model), and/or metadata (e.g., file-system permissions, host operating characteristics, parameters, design elements, layouts, and/or other configuration or declarations) pertaining to a system. As aforementioned, an advantage of embodiments of the present invention over existing approaches is that the program code in embodiments of the present invention can analyze disparate types of artifacts, including but not limited to, source code, executable code, data, network packet captures, data streams, configuration files, program trace output, file-system permissions, user account permissions, and firewall settings.

The program code analyzes the one or more artifacts by applying one or more rules (120). In some embodiments of the present invention, upon obtaining the one or more artifacts (e.g., 110) the program code stores the one or more artifacts to a computer-readable storage medium to which various analysis component(s) have access. In this analysis, as illustrated in FIG. 2, the program code can identify the type of artifact and/or elements of various types that comprise the artifact because the rules the program code applies can depend on the artifact type. Thus, as part of analyzing the one or more artifacts, the program code identifies one or more attributes of the artifact, including but not limited to, one or more of a type of technology, a software coding language, a platform, an operating, a network topology, a network boundary, a class hierarchy, a directory hierarchy, and/or or a file naming convention. In some examples, once the program code has identified an artifact type, the program code posts this identification to a notification queue. Thus, in some examples, program code comprising a registered analyzer that recognizes the artifact type begins processing the artifact. The different types of program code that analyze different artifacts are illustrated in FIG. 2.

Returning to FIG. 1, as part of this analysis, the program code provides facts and inferences it identifies. In some examples, when the program code (e.g., applying an analysis component) determines that one or more facts in a given artifact contain one or more elements of a threat model, the program code stores a fact reflecting the threat model element(s). Thus, the program code continually updates stored data (e.g., in one or more databases) that designate various facts that reflect risk. In some embodiments of the present invention, facts are stored and linked to the artifact types to which they are relevant. Thus, should the program code analyze an artifact of the same type (and/or the same artifact) at a later time, the program code can query the database to determine if there is information relevant to that artifact available. In some examples herein, the program code interprets the facts utilizing analysis components. Additionally, the program code stores these facts and can store these facts in a plurality of formats, which can be interpreted by analysis components, including but not limited to structured data or unstructured data. The program code can correlate these facts with any other fact to generate or update facts, including but not limited to facts which represent elements of the threat model.

In some examples, these rules enable the program code to establish identities and properties of elements of the threat model. The program code can automatically identify a role of a threat model element using one or more rules stored in a database. A role may include but is not limited to a set of permissions that a threat model element has, requests, or requires; or a behavior, a functionality, or a purpose of a threat model element. Also, as part of the analysis, the program code can deconstruct the computing system from which the artifact originated into elements comprising components, roles, external dependencies, and data; where the computing system is comprised of one or more computer applications, systems, or devices. These data can include characteristics or information handled by a system under analysis, including but not limited to, structured or unstructured documents containing sensitive or insensitive information. Sensitive information may include, but is not limited to, personally identifiable information, personal health information, and/or proprietary information. Code or circuitry which handles such information may also be classified as sensitive. Insensitive information may include, but is not limited to, public data. These documents may include, but are not limited to, configuration, inventories (DNS entries, host lists, or other asset inventories), source code, intermediate files (including but not limited to object files, compiled code, byte code, build logs), executable files, build files, log files, tool output, process traces, instrumentation logs, communication bus captures (including but not limited to network captures), memory captures, etc.

As part of this analysis, in some embodiments of the present invention, the program code identifies data sources by parsing the artifacts to determine elements of a computing system which produce data. To this end, the program code can analyze the properties of the parsed artifacts which relate to a well-known element of the system and which properties relate to a lesser-known element of the system. As part of this analysis, the program code can also identify data sinks to determine elements of the computing system which receive data. The program code can also identify data exit points by parsing artifacts to determine where data leaves an element of the computing system. The program code can additionally identify trust boundaries by locating function calls which are invoked with privileges, or which operate on a primitive of the operating system (OS in the broadest sense possible to include hardware) that can be accessed by processes other than the component relating to the artifact being analyzed. The program code can also identify these trust boundaries when analyzing artifacts by identifying trust boundaries as a function of data entry, exit, sources, or sinks. The program code defines or updates a trust boundary between the component calling the function and the component receiving the call. A boundary of a threat model may include, but is not limited to, one or more of a process boundary, a machine boundary, a network boundary, an electronic boundary, a logical boundary, a physical boundary, or a user or kernel mode boundary. In some examples, the program code identifies the boundaries of an artifact through machine-assisted learning based on data gathered from to the actions of, instructions from, or configuration from an operator of the present invention, to refine the function of the present invention.

Program code in some embodiments of the present invention generates a machine-learning model by training one or more machine learning algorithms, to identify elements of a threat model from an artifact, utilizing a set of the training data, where the set of training data comprises historical data that includes instructions from, or configuration from an operator of the present invention. The program code generates, based on the training of the machine learning algorithm, the machine-learning model. In some embodiments of the present invention, the machine-learning model can utilize a neural network (NN) to identify artifact boundaries. In certain embodiments of the present invention the program code utilizes supervised, semi-supervised, or unsupervised deep learning through a single- or multi-layer NN to identify boundaries of artifacts. The program code can utilize resources of the NN to identify and weight connections and train machine learning algorithms to identify the artifact boundaries. Training data including known elements of a threat model from existing artifacts and security mitigation actions implemented by operators that implemented changes to artifacts can be utilized to train the machine learning algorithms and to generate the machine-learning model to utilize to identify elements of a threat model in artifacts. The program code of the neural network can continue to train and re-train the algorithm(s), which can update the model, over time, based on operator actions relative to system artifacts.

When the program code analyzes the one or more artifacts by applying one or more rules (120), the analysis performed by the program code can be static and/or dynamic. As part of a static analysis, the program code can perform one or more of a data flow analysis, a lexical analysis, a semantic analysis, and/or a control flow analysis. As part of a dynamic analysis, the program code the program code can monitor one or more of a concrete execution of a program, a symbolic execution of a program, and/or a concolic execution of a program. In this context, data flows may include, but are not limited to, information flow between elements in the system under analysis and/or a representation thereof.

While performing an analysis on an artifact (120), the program code can also analyze the relationship of the artifacts with different elements of the computing system from which the artifact originated given that the configuration and orientation of the artifact within the system as a whole are part of the security aspects of the artifact and hence are relevant to the threat model. For example, as part of the analysis, the program code can identify one or more connections between computers. Also to this end, in some examples, the program code, in performing this analysis, observes a call in a call graph to a system element, determining a target of the call, determines an access requirement of the call target, stores the call, stores a call target, stores an access requirement of the call target in a first information structure, and uses the first information structure to generate trust boundary information. In some examples, the program code determines a permission of a caller in a call graph. As aforementioned, this analysis can be static and/or dynamic and the program code can determine this permission requirement by using one or more of a static analysis, a dynamic analysis, and/or an API call to a system that identifies permissions. The program code can obtain this permission information from an external system, including by not limited to, an Active Directory or LDAP service. The program code can also determine a permission requirement of a call target in a call graph. The program code can infer the ability of a caller in a call graph to make a call based on a permission of the caller, and/or a permission requirement of the call target.

In additional to analyzing individual artifacts, the program code can identify correlation properties between one or more artifacts. In some examples, the program code infers an entry point and/or an exit point by observing a correlation of properties between one or more artifacts. For example, the program code can infer an entry point by analyzing an artifact and observing a configuration entry of a program in a system under analysis which indicates the program may listen on a specified network port. The program code can also observe that a real-time process trace (or stream) does not indicate that the network port is available to callers. A stream may include, but is not limited to, data including but not limited to network or other communication bus data or instrumentation data sent to or from a component as it is produced. If an artifact of the system architecture is a data stream, incremental updates may be made to the artifact model. The program code can observe a packet flow to the network port, which indicates the program is processing network packets despite the lack of an observed entry point. Based on this observation, the program code generates a fact that indicates the program has an entry point on the observed network port. The program code can analyze this anomaly at a later time.

The program code analyzes one or more artifacts based on rules (120), and these rules can take different forms and can be configured and stored differently for access and application by the program code. Applying the rules can initiate an analysis, including but not limited to a static analysis, a dynamic analysis, a network analysis, and/or a process trace. To apply these rules, the program code can obtain the rules from a computer-readable storage device communicatively coupled to the one or more processors executing the program code or from a location such as a web site. The rules can be stored in a database and can include a markup, a script, and/or an executable instruction. For example, a rule stored in a database of the system or method can perform one or more executable instructions that can include interpreting an information structure to direct the analysis. The rules can include one or more criteria, which, when met, trigger the program code to publish a notification to including but not limited to a database or web service. The rules can include one or more machine learning models that can be applied to analyze the one or more artifacts.

Based on applying the rules, the program code infers one or more threat model elements (130). The rules can be understood as analysis components, which the program code applied to each artifact of the one or more artifacts, based on the program code determining that the artifact is relevant to system security. For each artifact, the program code can potentially generate facts or elements of a threat model; the program code can generate no facts for a given artifact, but many facts for another. To infer or identify the threat model elements, in some embodiments of the present invention, the program code identifies elements of the threat model from a corpus of artifacts of a computing system comprising one or more resources which implement, configure, reference, or otherwise describe one or more elements of the computing system. Specifically, the program code can leverage one or more rules to perform an analysis of the corpus dependent on the type of artifact(s) obtained by the program code (e.g., 110). As discussed above, the threat model generated by the program code provide a holistic view of system security. Thus, in generating the threat model, in some embodiments of the present invention, the program code identifies actors or dependencies by determining the coupling of elements of the threat model. The program code can also identify roles of the elements of the threat model by locating attributes including but not limited to those which indicate function of the artifact.

In embodiments of the present invention, as the program code infers one or more threat model elements, the program code can annotate the artifact such that the program code can identify these elements moving forward, should the program code analyze the artifact at a later time. As noted above, an advantage of the present invention over existing methods is that the program code can determine changes in security threats over time based on changes implemented to artifacts. In some examples, the program code annotates the (existing) artifact to provide for explicit traceability of the discovered elements of the threat model. Thus, when analyzing a given artifact, the program code can examine the artifact to validate correctness or presence of an annotation of an elements of a threat model.

Among the threat model elements which the program code can infer are (based on analyzing the artifacts and applying rules) are specific code fragments. For example, the program code in some examples can identify code fragments which implement security or privacy-relevant functions that are typically a part of a platform or an otherwise standard implementation. For example, the C standard library strcpy( ) function is known to create potential buffer overrun conditions. Although static analyzers can quickly identify the strcpy literal, it would not identify a function named, "mystrcpy" with the same implementation.

The program code generates a model which includes the threat model elements (140). From the individual analyses of various artifacts, the program code collects evidence of the elements of a threat model and incorporates these individual items into a holistic threat model of the system architecture (e.g., 140). In this way, the model resulting from the analysis of a system architecture is holistic.

The program code saves the model in a memory (150). The program code can store the elements of the threat model as facts and based on the initial analysis, the program code can store zero to many facts of elements of a threat model for each artifact of the one or more artifacts in a stored threat model for a given system. In some examples, when the program code generates a new threat model element, based on the analysis, the program code can update the stored threat model, including accessing the threat model in the memory (e.g., a database) to create, read, update, and/or delete one or more elements of the stored model.

In some embodiments of the present invention, the program code passes the threat model, which it stored, to an additional module or system or performs an additional analysis (e.g., a first analysis may include identifying where a threat model element has changed when compared with a second analysis). For example, program code of the present example or an additional system can perform a statistical analysis of one or more results of an analysis of the present invention or performs a machine learning that incorporates one or more results of the present invention. In some examples, based on generating the threat model, the program code generates a data structure to represent elements of the threat model, including but not limited to, a call graph, a data flow graph, and/or dependency graph. In some examples herein, the program code can utilize various facts or data provided from an external source accessible to the one or more processors to infer a common name for an element of a threat model.

In some embodiments of the present invention, the program code quantifies the risks presented by the one or more artifacts (160). In some examples, the program code generates a risk score which can represent risks associated with a given artifact and/or risk associated with a given artifact and/or with the system in which the artifact is implemented (based on the individual risk associated with various artifacts in this system evaluated by the program code). As discussed above, based on analyzing a given artifact, the program code can generate facts that describe a given artifact and correlate with elements of a threat model. Thus, in some examples, the program code can assign a confidence score to one or more facts generated by the program code, including but not limited to elements of the threat model. The program can also assign a risk score to identified elements of the threat model based on one or more properties of the artifacts of a system architecture that the program code analyzed. These risk scores may be recorded to a model. For example, the present invention may assign a risk score based on a data flow traversing a trust boundary that is known to be less trusted than a typical trust boundary or a trust boundary in the known system. The program code can determine risk scores for the system under analysis using one or more risk scores calculated from other systems that the present invention has analyzed. In some embodiments of the present invention, the program code can automatically deploy processes to address various threats identified in the model, for example, automatically reconfiguring communication ports, revising source code to mitigate threats, revising permissions for non-administrative users. In some embodiments of the present invention, the program code can generate and display a graphic representation of at least one element of the elements of a threat model in a graphical user interface, issue a command to reconfigure a component of the given computing system, and/or generate and transmit an alert to an administrator of the given computing system. In some examples, the program code generates metadata data to incorporate into an artifact (e.g., modifies source code with threat model annotations). In some examples, the program code identifies gaps in a security posture (e.g., issues a warning, "You do not appear to be protected against Y, install X or point us to X so that we can account for it."). In some examples, the program code determines connections between artifacts (e.g., source code is checked in to a repository, is built on a CI/CD server, and the artifacts are published to a location; the program code can generate a graphical representation of this connection).

As discussed earlier, a shortcoming of some existing security and threat analysis approaches is that they do not provide information to a user when changes to artifacts occur that potentially impact the security of the computing system in which the artifact is implemented. In some embodiments of the present invention, the program code alerts a user and/or administrator when sensitive code is changed. In some embodiments of the present invention, when program code analyzes one or more artifacts based on rules (120) and the artifact is source code, the program code can parse the source code to identify one or more sensitive areas within the source code and alert a user of the sensitive areas and potentially recommend that the sensitive areas are separated from the remainder of the artifact when implemented in a computing system. For example, if a component has many users with permissions to commit changes to the component with varying degrees of trust within an organization, it may be worthwhile for the organization to move the sensitive code to its own module and restrict access to that module. This way, the risk of the sensitive code being changed is reduced. The program code can identify the code as sensitive and set an alert to trigger when the code identified has changed.

Over time, threats identified can change and a given threat may no longer be valid. In some embodiments of the present invention, the program code determines if a given threat presented by an artifact is still valid. For example, if the program code determines that a connection is made to a website, the program code can attempt to connect to the website to determine if it this website remains accessible. The program code can parse a firewall configuration file to determine if an application in a system under analysis has limited access to the application via the firewall configuration, thus changing the security impacts of the potential website connection.

The program code in embodiments of the present invention can re-generate and/or update the threat model based on changes to a computing system in which the evaluated artifact was implemented and/or changes to the artifact itself, over time. For example, based on an update to an artifact, the program code can obtain the updated artifact and regenerate one or more artifact models (either in whole or in part). Based on an update to a threat model specific to an artifact, the program code can regenerate a threat model for the computing system (either in whole or in part) by processing the artifact according to the rules stored in a database (e.g., 120). Based on updating the system model, the program code can identify one or more new threat model elements according to one or more rules in a database.

FIG. 2 illustrates how in the analysis performed by the program code on each artifact obtained by the program code varies depending on the type of artifact. An advantage of embodiments of the present invention over existing threat and security evaluation approaches is that the examples disclosed herein can model threats in a system based on analyzing a diverse group of artifacts. In the workflow 200 illustrated in FIG. 2, program code executing on one or more processors obtains an artifact of a given computing system (for which the program code is modeling threats) (210). The program code determines the type of the artifact (215). In this example the program code evaluates whether the artifact is source code, binary code, a configuration file, a network capture, a process trace, a permission listing, or a Gerber file. These examples of file types are provided for illustrative purposes only and to illustrate a particular example. Configuration artifacts may take a plurality of forms including but not limited to service, daemon, firewall, or other system configuration; project files, build files; Registry keys, values, and data; compiler, linker, other build settings, and/or configuration included in source code. Additional embodiments of the present invention can analyze additional artifact types. Although not illustrated in FIG. 1, if the program code cannot recognize the artifact, the program code stores known details of the artifact to enable future analysis to improve the identification process moving forward.

The program code applies various rules to identify the type of the given artifact and based on applying the rules and making this identification, the program code invokes an analyzer relevant to the identified type of the artifact. The program code determines the type of artifact each artifact is (215) and accesses the rules for each type (214). By accessing the rules, in some embodiments of the present invention, the program code invokes the analyzer and the program code of the analyzers analyze the various types of artifacts (220). Rules typically cause an analyzer to be invoked. In the event that the program code cannot identify the artifact type and there is hence no specific analyzer, the program code performs a further analysis of the artifact (225). The program code of each analyzer examines the artifacts of a system architecture in variety of ways, for a variety of artifact types or formats, to automatically identify or infer the elements of a threat model (220). In the examples herein, each artifact is analyzed using a method dependent on its type. For example, source code written in the C programming language will be partially compiled to an intermediate form prior to being analyzed for elements of a threat model. The program code collects evidence of the elements of a threat model from the artifacts and incorporates these individual items into a holistic threat model of the system architecture (230). In this way, the model resulting from the analysis of a system architecture is more holistic when compared to other methods and systems. In some examples, the analyzers are written in domain-specific language and/or are of rules (e.g., 214) which perform actions based on properties of each artifact. Analyzers can also be hard-coded or can be add-in modules that are distributed. As aforementioned, the program code of the analyzers can incorporate the elements of a threat model identified or inferred from an artifact into a threat model for the system into which the artifact is implemented and/or originated, identifying threats to the architecture as a whole (230). The program code of the analyzers can also report statistics gleaned from this analysis. In some examples, the program code comprising the analyzers can publish results of their analysis to any number of data sinks. Data sink listeners can then perform an action based on the information published to the data sinks. For example, a data sink listener can update artifacts with properties which describe the elements of a threat model that were discovered. In some examples, the analyzers identify areas of interest to a security analyst related to risk areas including but not limited to cryptography, file-system access, network access, registry access, database access, chipset identification, and/or display characteristics. The program code stores the threat model generated by the analysis (250).

Figure 3:
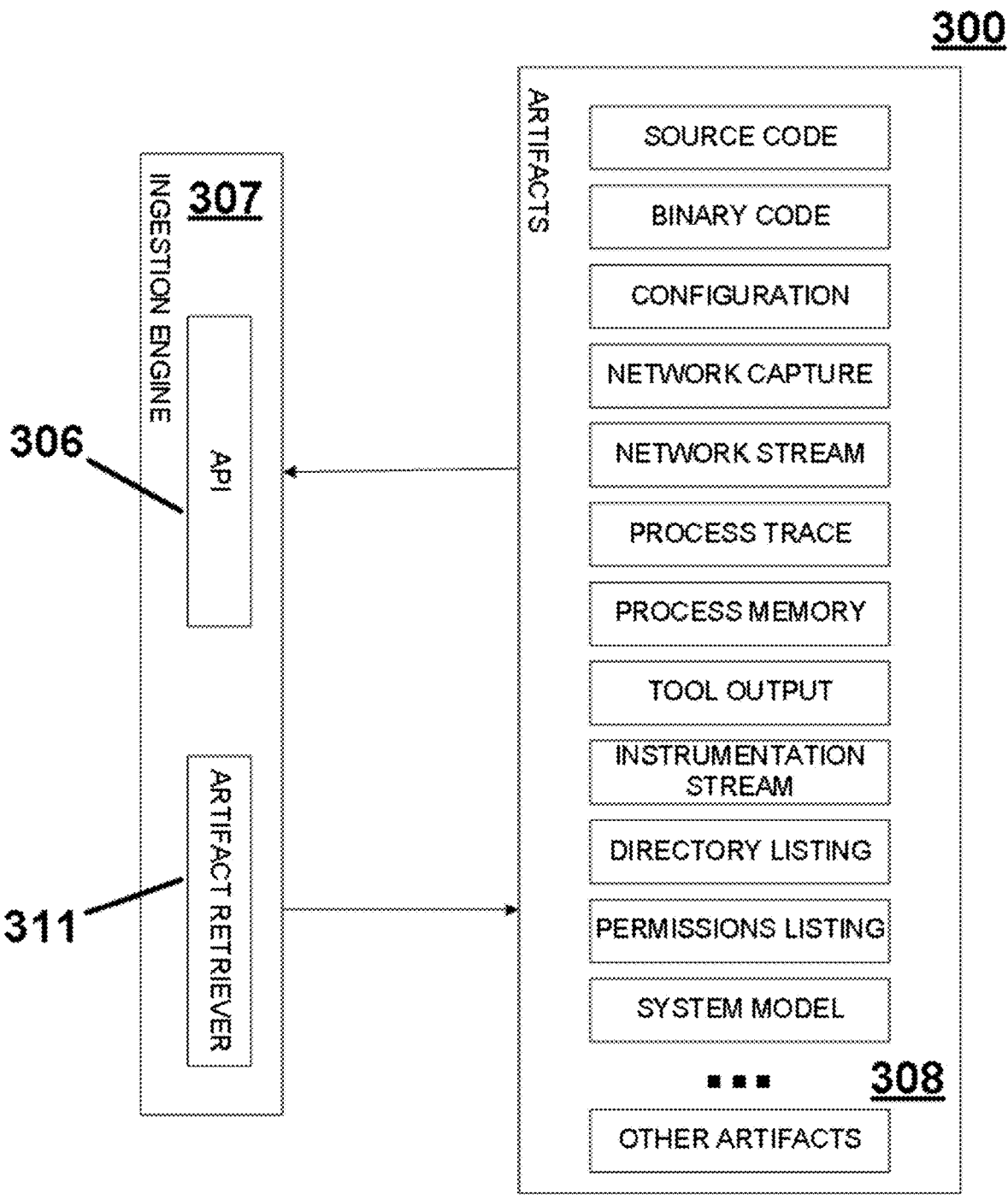
FIG. 3 depicts examples of some aspects of various embodiments of the present invention.

FIG. 3 includes a non-exclusive set of potential artifacts 308 that program code in embodiments of the present invention can analyze to generate elements of threat models for various artifacts and then, a consolidated (whole) threat model for the system (from which the artifacts originated) as a whole. As illustrated in FIG. 3, artifacts can include source code, binary code, configuration, network capture, network stream, process trace, process memory, tool output, instrumentation stream, directory listing, permission listing, system model, and other artifacts. In this non-limiting example, the program code of an ingestion engine 307, obtains the artifacts 308 via an API and can request artifacts 308 and/or additional artifact data (e.g., metadata), via an artifact retriever 311.

Figure 4:
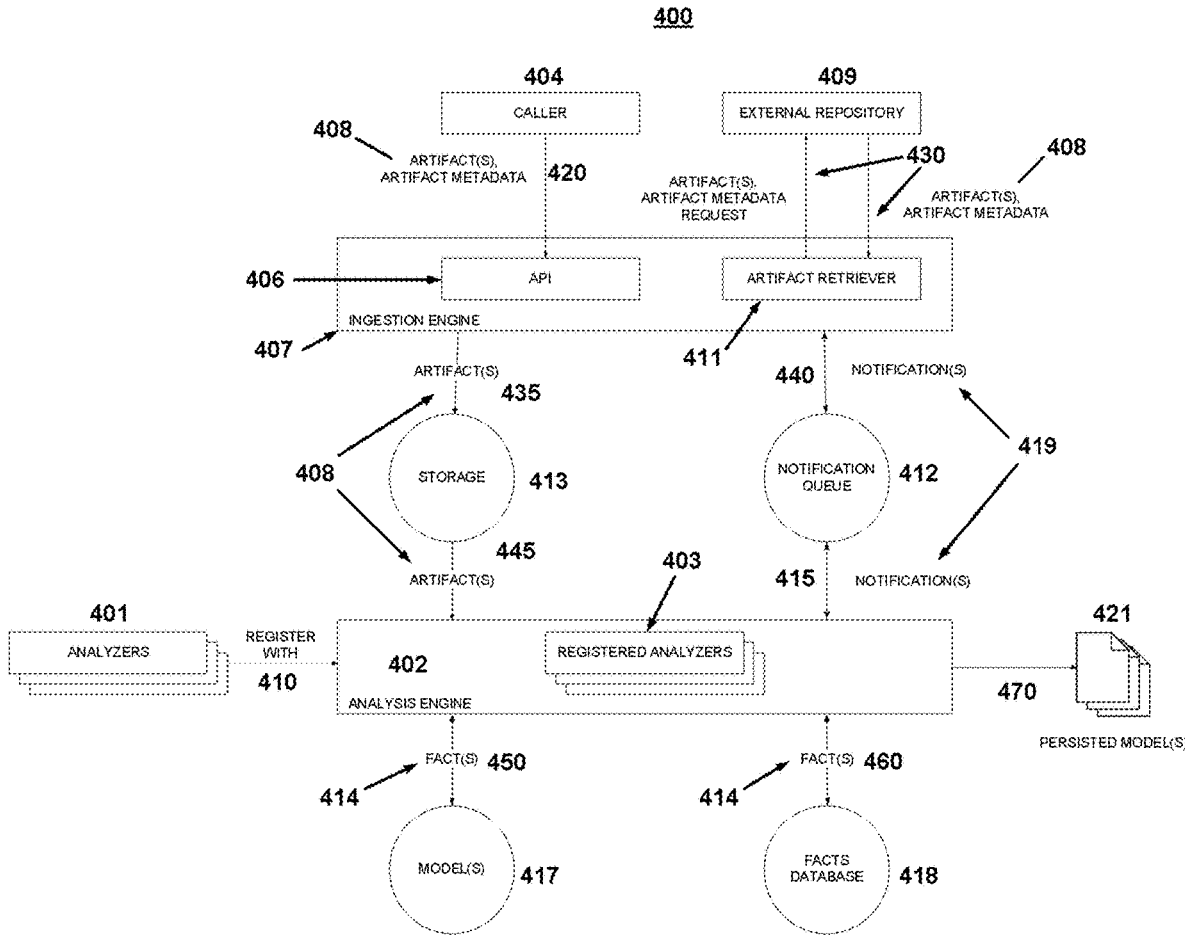
FIG. 4 depicts various aspects of a technical architecture of some embodiments of the present invention.

FIG. 4 is a technical architecture diagram 400 that illustrates interactions between various aspects of the present invention when implemented in a computing system. This technical architecture and/or various aspects thereof can be hosted in an on-premises or in an distributed computing environment. As understood by one of skill in the art, the distribution of the functionality into modules in FIG. 4 is just one example of a possible distribution and implementation of the functionality. Various functions can be combined and/or separated into one or more modules. This particular example is provided for illustrative purposes and not to suggest any limitations. FIG. 4 illustrates interactions between components and actors in a given configuration of aspects of an embodiment of the present invention. An Actor may include, but is not limited to, one or more persons, technologies, organizations, or dependencies that leverage an artifact of a system.

Referring to FIG. 4, in some embodiments of the present invention, program code executing on one or more processors, referred to herein as an analysis engine 402 registers one or more analyzers 401, 403 and subscribes the analyzers to a notification queue 412 (410, 415). The configuration of the analysis components, in this example, the analysis engine 402 can be stored on a computer-readable storage medium. Analysis component configuration can comprise conditions present on a communication bus. The analysis engine 402 can include different types of analysis components, including parsers (see, FIG. 6) and analyzers. These analysis components can be configured via one or more structured files on a filesystem in a technical architecture in which aspects of the present invention are implemented. As understood by one of skill in the art, various types of existing analyzers and parsers can be utilized herein to parse different types of artifacts. Additionally, certain proprietary analyzers can also be utilized to analyze various artifacts. In some embodiments of the present invention, the analyzers 401 register themselves and subscribe to a notification queue 412 (410, 415) to receive notifications of available artifacts. Upon receiving notifications that artifacts are available for analysis, these registered analyzers 402 will analyze one or more artifacts 408, including artifact metadata, of a system architecture obtained by the program code. These artifacts are provided to the program code by a caller 404 via an API 406, to the program code of an ingestion engine 407 (420). In some embodiments of the present invention, the program code obtains artifacts 408 from an external repository 409 (430). For example, the program code of the ingestion engine 407 can receive a notification from the notification queue 412 (440), where the notification triggers the program code of the ingestion engine 407 to obtain additional artifacts 408, including from an external repository 409 (430).

The program code that obtains the artifacts 408 in this manner is referred to in FIG. 4 as an artifact retriever 411.

Thus, both the caller 404 and the artifact retriever 411 can provide the program code of an ingestion engine 407 with artifacts 408 (which can include artifact metadata). The program code stores the artifacts 408 in storage (memory, database, etc.) for reference (435). The program code posts a notification to a notification queue 412 each time the program code (of the ingestion engine 407) obtains an artifact (440). In some example, the program code notifies a communication bus of its receipt of the artifacts and provides a link to the location of the artifact(s) stored on the computer-readable storage medium 413.

Returning to FIG. 4, program code comprising a notification engine 402, which comprises the registered analyzers 403 obtains a notification 419 (the program code posted to the notification queue 412 when a new artifact 408 was obtained by the ingestion engine 407) (415). The program code of the analysis engine 407 performs an analysis to determine the type of artifact of the artifact 408 obtained by the ingestion engine 407. The analysis engine 402 receives a notification 419 posted to the notification queue 412 when a new artifact has been obtained by the ingestion engine 407. The program code of the analysis engine 402 performs an analysis to determine a type of artifact 408.

Figure 6:
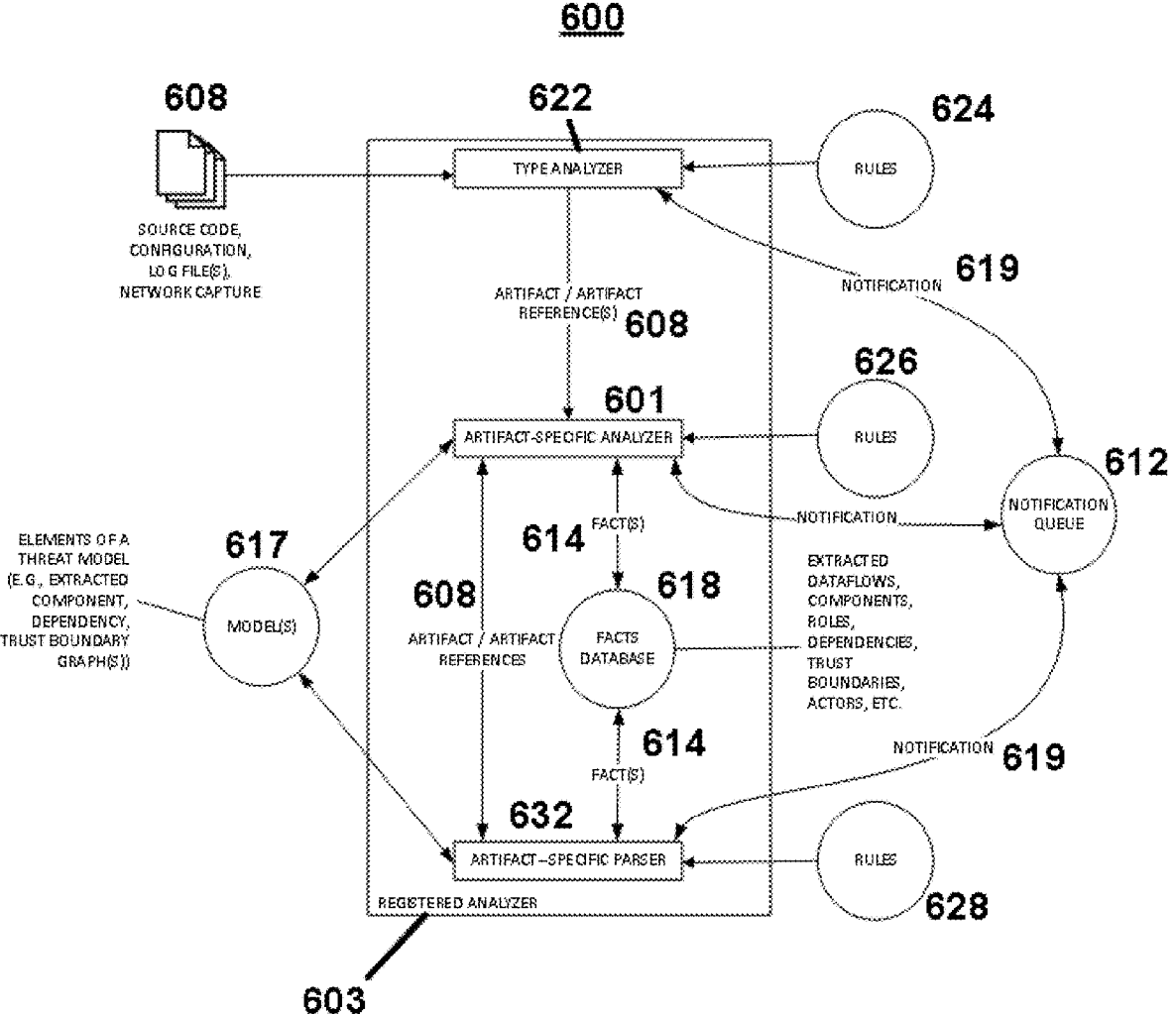
FIG. 6 depicts various aspects of a technical architecture of some embodiments of the present invention.

FIG. 6 is a more detailed illustration 600 (when compared with FIG. 6) of an analysis performed by a registered analyzer 603 comprising at least one artifact-specific analyzer 603. Thus, aspects of both FIG. 4 and FIG. 6 are referenced when describing the analyses performed and the determinations made by a registered analyzer 603, in some embodiments of the present invention. In some examples, the program code determines the type of each artifact 408 using a series of rules including a confidence score indicating the likelihood that the type is correct. For example, if the artifact 408 is a regular file, the program code in some embodiments of the present invention determines the type by examining the file extension or looking for an identifying sequence of bytes in the file which map to a known file type. The program code may determine the type through explicit configuration provided in metadata with the received asset (see, 420, 430). As illustrated in FIG. 6, program code of a type analyzer 622 obtains an artifact 608 (e.g., source code, configuration file, log file, network capture, etc.), and informed by rules 624, including but not limited to preconfigures rules, determines the type in advance of analyzing the artifact 608, using program code comprising an artifact-specific analyzer 601.

The program code stores type information for each artifact 408 as facts 414 in a facts database 418 (460). The fact database 418 contains all known facts about a system and can be queried by other analyzers (e.g., the registered analyzers 403). The fact database 418 is a computer-readable storage medium. In some embodiments of the present invention, the program code of the analysis engine 402 (e.g., type analyzer 622) determines the type of artifact 408 (e.g., artifact 608) by analyzing the properties of the artifact 408 (e.g., inspecting the file signature). The program code of the analysis engine 402 uses this identification to reference a set of stored call sites for the identified artifact type. The set of call sites may then be used by a rule to identify all call sites in the provided artifacts. When the program code determines an artifact type for a given artifact 408, 608, the program code posts this determination to the notification queue 412, 612 along with a reference to the stored fact (440). Thus, when the registered analyzers 403, 603, which have subscribed to the queue 412, 612 obtain notifications of an available artifact, a relevant analyzer for the artifact type (e.g., artifact-specific analyzer 601) can begin processing the artifact.

Returning to FIG. 4, as will be discussed in greater detail, program code comprising one or more analysis components 403, which have registered for notifications of available artifacts, receive notifications (415) via the notification queue 412, obtain one or more artifact 408 from storage 413 (445) and perform a determination as to the relevancy of the provided artifact(s) to their method of analysis. These one or more analysis registered analysis components 403 perform an analysis on each artifact. If the registered analyzer 403 determines that the artifact 408 is relevant, the analyzer generates zero or more facts 414 or elements of a threat model, for that artifact. In some embodiments of the present invention, the program code determines if any part of an artifact 408 was previously analyzed by the system or whether there is redundancy within the artifact itself, to avoid duplication. Areas of code which are similar and can be consolidated or at risk of potential security issues may also be identified. Thus, previously analyzed portions of an artifact (e.g., source code) need not be analyzed again (as the results can be pulled from one or more of the fact database 418 and the stored models 417). Also, even if the artifact has not been analyzed, the program code can consolidate the artifact to avoid redundancy. In this example, facts 408 are stored both in a fact database 418 and included in stored models 417 because, as aforementioned, facts may include but are not limited to elements of a threat model (including but not limited to entry points, exit points, callers, call sites, call parameters, callees, and/or data flows) or other properties of a security or privacy architecture (including but not limited to encrypted data, transport selection, materials, and/or external references) which can inform the generation of a security model. The program code can utilize one or more facts 408 to infer one or more elements of a threat model. For example, given a caller, a call site, call parameters, and a callee as facts, a fact indicating the program code can infer the presence of a data flow. In various examples, the program code identifies facts, including but not limited to, resources accessed by a build system during a build, file system permissions (e.g., of a directory on a file-system in which a provided artifact including but not limited to source code or executable code resides), network discovery or vulnerability scanner output which includes but is not limited to including open port information, service version numbers, or operating system identification or guess), or executable file properties.

The program code stores the facts 414 (460) in one or more database 418 and stores facts 414 comprising elements of a threat model for the artifact 408 as a model 417 (450). If the analyzer 403 determines that facts 414 indicate that the artifact 408 comprises an element of a threat model, the program code stores the facts 414 (460). From the individual elements of the models relevant to the analyzed artifacts, the program code persists one or more model 421 relevant to the system, as a while (470). The program code can add one or more elements of a threat model 417 to the model 421. The program code persists one or more models 421 as a model containing security properties. An operator may direct the program code to persist the model 421 in a specified format. In some embodiments, the program code can persist a model 421 to a filesystem as one or more documents of markup including but not limited to XML or JSON. The program code can persist the model(s) generated in a plurality of formats including but not limited to one or more structured files or databases. In some examples, the program code stores the one or more models 421 as properties or attributes on source code provided as an artifact to the present invention. In a non-limiting example, the program code persists the model in a database, a structure file, in source code, and/or in a configuration file of the system under analysis, depending on a configuration of the example.

The persisted models 421 can be integrated with other systems, which can provide further analysis, including but not limited to, identifying differences between two provided models or differences in components of provided models. The program code can utilize the persisted models 421 to generate a graphical illustration, including but not limited to, heat maps of sensitive areas of artifacts. Program code (executing on one or more processors) can determine placements of an element of a threat model on a visual surface and persist this information. In some embodiments the asset can be stored in a blob, object, or other type of storage.

Embodiments of the present invention can comprise analyzers 401, which become registered analyzers 403, for artifact types of any type in any computer-readable format. An analyzer 401 may use rules to determine the elements and properties of an artifact 408 relevant to a model which describes the system and stores its discoveries as facts in a fact 414 database 418 (460). In some embodiments, rule (e.g., FIG. 2, 214) cause an analyzer 403 to invoke a separate component to perform additional analysis, including but not limited to, parsing source code or configuration. The analyzers 401 may retrieve facts 414 stored by other analyzers. An analyzer 401 can generate facts 414 which are the elements of a threat model 417 as practicable.

Some artifacts 408 can be analyzed by one or more analyzer 401 (e.g., registered analyzer 403) in various embodiments of the present invention. For example, in the case of an artifact 408 with an artifact type of source code, an analyzer 401 may perform a lexical analysis, store a parse tree in a model which refers to the artifact 408 from which it was produced, and notify other components that its processing is complete. A second analyzer may process the parse tree generated by the first analyzer, perform an analysis based on a rule, and produce a list of components present in the asset to which the artifact 408 belongs. A third analyzer may process information produced by the first and second analyzers, perform an analysis based on one or more rules stored in a second database and produce a list of roles present in the system under analysis (system architecture). A fourth analyzer may utilize information from a component that has not executed yet and therefore will not run until it has been notified (e.g., via the notification queue 412) that this information is available.

An analyzer 401 can determine one or more roles of a component in a model by examining artifacts 408, models 417, and/or facts 414. Once the program code determines a role of the asset type, the role can be stored (460) as a fact 414 (e.g., in the facts database 418), along with a confidence score indicating the likelihood that the fact 414 is correct. FIG. 5 is a workflow 500 that illustrates certain aspects of some embodiments of the present invention. FIG. 5 is provided as an overview of certain aspects illustrated in more detail in other figures, including but not limited to, FIG. 4. As illustrated in this workflow 500, in embodiments of the present invention, program code executing on one or more processors determines asset composition (components) of a system under analysis (510). The program code determines users and/or actors (actors) of the system under analysis (520). The program code determines data handled by the system under analysis (530). The program code determines entry points to and exit points of the data handled by the system under analysis, including determining trust boundaries traversed by data handled (540). The program code stores these determinations in one or more models of the system under analysis (550).

In some embodiments of the present invention, the program code determines elements of a threat model for a system (from which the analyzed artifacts were obtained) by applying a definition in a provided specification, including but not limited to a rule. The program code applies the rule to analyze the facts 414 identified in the individually analyzed artifacts 408. The program code stores elements of a threat model relevant to each artifact 408 as facts.

As aforementioned, as part of identifying elements of a threat model for an artifact, program code in embodiments of the present invention determines entry points for artifacts 408. For example, the program code (of an analyzer 401) can determine an entry point for a given artifact 408 and/or for a system from which the artifact 408 was sourced by monitoring/observing code which is executed based on a property or configuration of the code. In the case of ASP-.NET, it is possible for the code to contain an attribute placed on a class method which identifies it as a method callable from the Web. The following code illustrates an example method entry point for REST HTTP requests in C#. A class method is considered an entry point to the Web application that the code defines.

```
[Route("api/[controller]")]
public class UserController : Controller
{
    [HttpDelete("{id}")]]
    public async Task<IActionResult> DeleteAsync(int id)
    {
        // implementation goes here
    }
}
```

In some embodiments of the present invention, the program code of the analysis engine 402 processes an artifact 408 and (in the case of source code, for example) by parsing it into an abstract syntax tree and performs a static program analysis of the AST.

The program code of the analysis engine 402 applies various rules. For example, based on a rile, the program code of the analysis engine 402 can identify an entry point based on the result of the static program analysis. In this way, the program code can determine, for example with the aforementioned source code, that there exists a Web endpoint called *api/user* which has a Web entry point accessible via the HTTP DELETE method.

The program code can determine that the run-time user account which the Web process is running under has not yet been collected, and through a log or other user interface, suggest it can be acquired. The configuration of the machine hosting the Web process may then be collected which can be used to identify the user the Web process is running as.

In the case of a communication bus capture artifact (including but not limited to a network packet), the program code of the analysis engine 402 can identify an entry point and/or an exit point by examining the connection properties of a packet including but not limited to a protocol type, source and destination IP addresses, and port number. The program code can determine an entry point by the destination IP address, port, and/or protocol type. The program code can determine an exit point based on one or more of a source IP address, port, and/or protocol type. Other properties of a communication bus may include medium or device type (including but not limited to radio frequency or hardware device including but not limited to USB dongle or one-time password key device).

In the case of a process trace, profiling data, or other log-type artifact, the program code can determine elements of a threat model, including but not limited to an entry point or exit point, by parsing the artifact, identifying recorded log entries known to the system which indicate an element of a threat model, and recording the associated properties of the log entry.

In some examples, the program code can identify the elements of the threat model via configuration by examining the properties of (including but not limited to) a build file or build log file, including definition of but not limited to library dependencies, network settings, application routes and associated properties including but not limited to controllers, actions, and parameters; file-system properties, external repositories, required or preferred version numbers of dependencies, cryptography settings, runtime settings, trace and debug settings, compiler and language provider settings, application settings, extensions, and other configuration properties.

Referring to FIG. 6, as illustrated herein, program code of a registered analyzer 603 obtains an artifact 608. The program code of a type analyzer 622, applying rules 624, determines the type of artifact 608. In some examples, the type analyzer 622 verifies that the registered analyzer 603 comprises an artifact-specific analyzer 601 with program code to analyze the artifact 608 for security concerns. When the type analyzer 622 (applying the rules 624) has determined the type of the artifact 608, the program code posts a notification 619 to a notification queue 612, to which the registered analyzer 603, is subscribed. Depending on logic, including logic and configurations tied to metadata associated with the artifact 608, the program code of the artifact-specific analyzer 601, applying rules 626 and/or the artifact-specific parser 632, applying rules 628, obtain the notification 619 of the new artifact 608 of the relevant type. The program code of the artifact-specific analyzer 601 analyzes the artifact and/or the artifact-specific parser 632 parses the artifact to determines facts 614. In embodiments of the present invention, ruled utilized by an analyzer (e.g., rules 626) can identify elements, including but not limited to, components, roles, external dependencies, trust boundaries, and actors.

Returning to FIG. 6, the program code saves these facts 614 in a facts database 618, which is accessible to additional registered analyzers. The facts can include elements of a threat model. Facts 614 include, but are not limited to, extracted dataflows, components, roles, dependencies, trust boundaries, actors, etc. In some examples, the artifact-specific analyzer 601 obtains a notification of the new artifact, but to extract the facts 614, the program code of the artifact-specific analyzer 601 invokes an artifact-specific parser 632 to extract fact(s) 614. If the artifact provided is source code, the artifact-specific parser 632, in some examples, parses the source code to generate an abstract syntax tree (AST). The program code of the artifact-specific analyzer 601 or another artifact-specific organizer analyzes the AST. The artifact-specific analyzer 601 and/or the artifact-specific parser 632 generate elements of a threat model 617. These elements 617 include, but are not limited to, extracted components, dependencies, trust boundaries, and/or graphs. In some examples, the properties of a model generated by the program code (which includes the elements 617 from the various artifacts) is defined by rules which operate on the model.

As discussed with reference to FIG. 4, analysis components in embodiments of the present invention can include both analyzers and parsers. FIG. 6 illustrates aspects of an embodiments of the present invention that includes but an analyzer, artifact-specific analyzer 601, and a parser, artifact-specific parser 632. Both analyzers and parsers are discussed below.

In the context of the examples herein, analyzers include but are not limited to components which perform analysis of one or more artifacts of a system under analysis, one or more models generated by a parser, or one or more facts generated by an analysis component, for the purpose of generating zero or more facts about an artifact or the system under analysis. Analyzers can determine components of a system architecture, properties of components (including but not limited to role), and relationships between components. Analyzers can receive data (including but not limited to one or more artifacts of a system architecture or data from another analyzer or parser) and identify patterns and relationships to produce facts that can be stored in a model. These facts can be analyzed by other analyzers to generate one or more elements of the threat model (e.g., FIG. 6, 617). Analyzers can request additional information to perform an analysis and request these data from a parser. Analyzers can operate on a plurality of artifact types provided to the present system.

Parsers like artifact-specific parser 632 parse artifacts 608 of a system under analysis to generate elements of a threat model 617, and/or generate intermediate data structures or models or facts 614 used by analyzers, including the artifact-specific analyzer 601, to generate elements of a threat model 617. Generally, in various embodiments of the present invention, parsers can determine the type of artifact provided to the present system using any number of methods including but not limited to extension matching, file introspection, binary header parsing, graph traversal, image comparison, or otherwise. Parsers can parse source code languages and related metadata including but not limited to C, C++, C#, Java, Ruby, Python, Go, Rust, Makefiles, intermediate code or byte code, and project files. Parsers can parse executable file formats including but not limited to ELF, a.out, PE, and Mach-O. Parsers can parse network datagrams including but not limited to IEEE 802 protocols such as IP, UDP, TCP, and 802.11. Parsers can also parse network datagrams stored in archive formats including but not limited to 'pcap'. Parsers can parse process instrumentation tracing formats including but not limited to output from ptrace, strace, and Process Monitor. Parsers can parse raw file system formats including but not limited to VHDX and text-based file listing formats such as the output from GNU 'ls'. Parsers can parse tool output from one or more tools known to the present system including but not limited to the output of standard UNIX tools such as 'find' and 'ps'. Parsers can be pluggable add-ins to the present system and register or be registered with the present system to support or act upon particular artifact properties identified by the present system or method including but not limited to document types. In some embodiments, parsers can be accompanied by metadata which instruct the program code to direct all artifacts of a specified type to a given parser (e.g., an artifact-specific parser 632). In various embodiments of the present invention, parsers can communicate with other Analysis Components through a communications bus.

In embodiments of the present invention, various processes can utilize rules. In the example illustrated in FIG. 6, the program code of the type analyzer 622, the program code of the artifact-specific analyzer 601, and the program code of the artifact-specific parser 632, all apply rules 624, 626, 628. Thus, as illustrated in FIG. 6, rules can be utilized by various components in various embodiments of the present system. Rules can aide but are not limited to aiding in the identification of elements of the threat model or information that can be used to identify these or other properties of an artifact of the system under analysis. Rules can be stored in one or more computer-readable storage mediums including but not limited to a database or a structured file. Rules can contain one or more definitions which identify properties of an artifact which qualify it to be included in a model generated by the present system as a fact, including but not limited to properties of an element of an artifact which represents or informs an element of a threat model, properties of an artifact which indicates, represents, or informs an element of a threat model, properties of an operating characteristic which necessitates a boundary (including but not limited to a trust boundary) between components, facts which when considered individually or together represent a new fact, definition of one or more inferences with regard to the system under analysis that can be made given the availability of facts generated by the present system or method. Rules can include one or more definitions which define set of conditions, queries, or otherwise for a fact to be considered true or for the rule to be invoked. Rules may include or be implemented in executable code. Rules can include one or more actions that can be executed when a condition expressed in the rule is met. Rules may include one or more actions which the present invention may use to generate a fact, or a set of actions which may be used to collect more information regarding the system under analysis to elicit a fact, or a set of tags or labels which can be used to organize facts. A rule can identify code which reduces to a set of instructions or properties which are equivalent to another set of instructions or properties. For example, the preferred embodiment can identify code which implements the C standard library memcpy function but does not use the C standard library memcpy function to do so. Rules can aid in validating one or more models generated by the present system. For example, rules can be used to determine portions of an artifact, model, or system under analysis that are missing from a model. In some examples, rules can identify version numbers using a plurality of methods across one or more properties of a software or hardware package or types of artifact contained in or a software or hardware package.

Program code in embodiments of the present invention can make determinations about facts and elements of threat models for different types of artifacts by applying different analyses, including by utilizing different artifact-specific analyzers (e.g., FIG. 6, 601). Referring to FIG. 6, an artifact-specific analyzer 601, can analyze an artifact 608 that is a memory capture utilizing rules 626. By applying the rules 626, the program code of the artifact-specific analyzer 601 examines the capture for patterns that can be used as facts 614, which indicate the presence of an element of a threat model on their own or through correlation and/or combination with other facts 614 collected by the program code.

In some examples, when the program code obtains artifacts comprising object files, compiled code, executable files, and/or other artifacts which represent an application that is not in source code form, the program code can transform each artifact into an intermediate representation and perform an analysis, including but not limited to, a static analysis. A similar analysis may occur on an artifact including but not limited to byte code. A rule (e.g., FIG. 6, 624, 626, 628) can then extract facts (e.g., FIG. 6, 614) which may inform an element of a threat model (e.g., FIG. 6, 617). The program code can also apply the rules to examine the artifacts directly without first performing a transformation.

As aforementioned, facts and elements of threat models identified by the program code can include, but are not limited to, exit points, component boundaries (e.g., logical, physical, computing process, etc.), and/or components (themselves). In some examples, the program code can determine exit points for one or more artifacts by monitoring an invocation or potential invocation at a call site of a function known or inferred to transmit data outside of the boundary of the component containing the call site. The program code can identify components using feature clustering, coupling, traceability, or other relationship modeling methods. The program code can identify components utilizing the structure of an artifact, including but not limited to, a location or organization within a project file, and/or physical presence or location in an electronic device as determined through a photographic image. The program code can parse and analyze artifacts generated by other systems. The program code can utilize control flow, data flow, and/or other types of artifacts (or results of the analyses of these artifacts) to identify a distinct component. The program code can infer logical component boundaries, for example, based on names (including but not limited to file names, class names, host names, or other monikers), serial numbers, addresses, and/or other identifying characteristics. The program code can determine physical component boundaries by making inferences from elements such as physical separation, connection, and/or delineations in artifacts provided to the program code, including, but not limited to, firmware properties.

The various analyses performed by the analyzers and parsers in embodiments of the present invention are large in scope. Below, some examples of functionality in embodiments of the present invention are listed.

In some embodiments, the program code can use methods including but not limited to leveraging, generating, and/or analyzing a data flow graph and/or control flow graph for data sources and sinks, and map them to known entry point and/or exit points.

In some examples, if a rule does not contain logic to recognize an entry point and/or exit point or a data flow of a first artifact, and the present system observes a data flow in second artifact, the presence of a data flow can be used to infer future data flows. For example, if a communication bus capture (including but not limited to a network packet capture) indicates a connection from Component A to Component B, and the system knows Component A is present in the corpus of provided artifacts (that is, it is found in the system under analysis), and the present system has source code but that the present system also has incomplete knowledge of possible entry points present in the source code, the program code (executing on one or more processors) can determine a process associated with the source code triggered the data flow in the source code which triggered the data flow, and store that information for use in further analysis of source code which match the type of source code present.

In a non-limiting example, the boundaries of an artifact a system can be identified through machine-assisted learning based on data gathered from including but not limited to the actions of, instructions from, or configuration from an operator to refine the analysis of the present system. An operator can thereby train the present system to identify elements of the threat model.

An entry point and/or an exit point can be inferred by observing a correlation of properties between one or more artifacts. For example, an entry point can be inferred by analyzing an artifact and observing a configuration entry of a program in a system under analysis which indicates the program can listen on a specified network port. It can also be observed that a real-time process trace (or stream) also being analyzed by the present system or method does not indicate that the network port is available to callers.

Program code of can observe a packet flow to the network port which indicates the program is processing network packets despite the lack of an observed entry point known to the present system or method. This can cause a fact to be generated which indicates the program has an entry point on the observed network port. This anomaly can then be analyzed later.

The program code identifies entry points and exit points through a plurality of methods and associated a confidence score with each entry point and exit point identified.

In some examples, the program code identifies data by observing elements including but not limited to one or more documents, components, objects, or parameters handled by an artifact provided to the present system. Data may be considered sensitive depending on the context in which it is observed. rules may be used to identify sensitive information.

In some examples, the program code identifies data flows by performing a data-flow analysis of a provided source input data to a component of a system under analysis and a sink location or destination corresponding to that input data.

In a non-limiting example, the program code classifies data, data flows, and components based on the properties provided to the present system or classified based on inferences made by the present system (including but not limited to source of the data or context) when analyzing data, data flows, or components. Further, if the data is found to originate in a component which is classified as private, the program code can classify the data flow as private.

In some examples, the program code identifies trust boundaries by observing the access control attributes (including but not limited to permissions) applied to operating characteristics of a system under analysis (including but not limited to primitives of an operating system), including but not limited to files, objects, processes, and sockets; function calls, implementation properties, communication bus flows (including network data flows), configuration, or policy declaration. The program code can identify trust boundaries by applying rules to direct the observation function calls, entry points, dependencies, or other relationships that are known to cross trust boundaries including but not limited to those which exist in other components or use objects which are accessible by other components. The program code can identify trust boundaries by observing physical separation of components including but not limited to through a provided digital image or other artifact.

In some examples, the program code can identify actors (e.g., users) by observing an entry point or exit point of a system and observing data flowing to or from that entry point (e.g., through a network packet capture, indicating an inferred network port that indicates a user is a Web user or script). The program code can determine a type of user by examining properties of the artifact. For example, the HTTP header Actor-Agent of a request to an entry point may indicate that the requesting user is leveraging a command line tool (including but not limited to the curl utility) or a Web browser (including but not limited to Firefox). Actor information may also be extracted from artifacts including but not limited to an HTTP Cookie or JSON Web Token.

In some examples, the program code collects properties about a call site including but not limited to the target code, which was invoked, parameters, and any configuration that may have been generated. In some embodiments, if an artifact of a system architecture is obtained by the program code which contains state information from a program execution, the present invention can extract security-relevant facts. This can include but is not limited to code found in a dynamically loaded library, an IP address, or credentials.

In some examples, the program code can provide hints in relation to the facts which indicate that if the operator of the present invention were to provide artifacts of one or more types, more detail on the operation of the system under analysis can be provided.

In some examples, the program code can update facts as artifacts are updated. For example, if all artifacts checked in to a version control system were sent to the present invention via a continuous integration/continuous delivery system (CI/CD) system, and a developer were to make a change to code, the present invention would recognize the change and incorporate the change into a model.

In a non-limiting example, each parser and analyzer uses one or more rules. A parser rule contains logic to direct the preparation of an artifact of a system under analysis for analysis. An Analysis rule contains logic to extract the elements of the threat model from an artifact of a system under analysis or from a model generated by the present system.

In some embodiments, a first parser can be configured to register for file listings which contain file permissions, a second parser can register for source code, and a third parser can register for messages which come from a communication bus indicating new facts are available. The first parser can then receive a file listing containing permissions of the files listed. A parser rule of the first parser can examine the file listing, extract the file names, paths, and permissions of each file; store them as facts, and report to a communication bus that new facts are available. The second parser can then receive source code which contains a function call which operates on files. A parser rule of the second parser can examine source code using a regular expression pattern which matches the function call which operates on files. The parser rule of the second parser can then extract the parameters of the function call to determine the name of the file, store it as a fact, and report to the communication bus that new facts are available. The third parser can then receive the notifications of new facts, and a parser rule of the third parser can then associate the file discovered by the parser rule of the second parser with the file permissions of the corresponding file discovered by the parser rule of the first parser, store it as a facts, and report to the communication bus that a new fact is available.

In some examples, if an artifact provided to the present system is an archive (including but not limited to a ZIP file), a first parser with a first parser rule can instruct the present system to test and extract the ZIP file to a temporary directory. Once the archive has been extracted, the first parser rule can communicate this to a communication bus as an extraction event.

In some examples, a first analyzer can contain a first analyzer rule which, upon receiving notification of the archive extraction from the communication bus, will scan the temporary directory for artifacts, and report each to the communication bus as a "new artifact discovery. A second parser with a second parser rule for C source code will receive notification of the new artifact discoveries and find C source code was present in the archive. The second parser rule will then parse the C source code into an abstract syntax tree (AST), store it in a first model, and report to the communication bus that an AST is available for the corresponding C source code file. A second analyzer can contain a second analyzer rule which performs an analysis of the AST, identifies facts, stores the facts in a second model, and notifies the communication bus that new facts are available. A third analyzer can contain a third analyzer rule which examines the new facts, compares them with existing fact, and identifies elements of the threat model that have not previously been discovered. The third analyzer can also refine existing facts based on the new facts or modify the properties of previously identified elements of the threat model based on the information presented in the new facts.

In a non-limiting example, a database contains a property mapping which identifies code functions which map to elements of the threat model, and parameter types for function calls.

In some examples, an analyzer rule pertaining to source code may include an identification of a function name or attribute which is known or inferred to expose an entry point or exit point in a system under analysis.

In some examples, an analyzer may use one or more rules stored in a first database to identify or infer elements of the threat model from facts stored in a second database. elements of the threat model are added to a model of the system under analysis.

As additional facts are gathered, the program code (executing on one or more processors) can update the model. An operator of the present system may request that the model be persisted to a computer-readable storage medium.

As aforementioned, an artifact of a system architecture may include a network packet capture or a stream of network traffic. A network connection reveals the intent of two parties to connect to one another. The party initiating the connection reveals an IP address and, in the case of UDP or TCP, reveals a destination port. The response (or lack thereof) of the party at the receiving end of a connection initiation (the remote host) may indicate whether a service is listening there. The program code can infer from viewing network traffic that a party initiating a connection to a remote host is running an application that wishes to connect to the specified destination port. In the case of TCP, if the remote host responds to requests sent to that port and the subsequent series of packet exchanges establish a TCP session, it indicates the remote host was (and still may be) listening on the remote port. Therefore, it can be inferred that a service may be listening on the remote host on the specified port. In some embodiments, the program code confirms this fact by using the network to probe the remote host to validate the availability of the listening port. However, a fact cannot confirm that the associated element of a threat model exists in the received artifacts of a system architecture.

In other embodiments, the elements of the threat model can be added to a received artifact (including but not limited to source code) as markup or comments. In a non-limiting example, Program code executing on one or more processors can be configured to do both.

In some embodiments, an analyzer rule can extract control flows between components. A control flow can include a caller, a call site, and a callee. A caller includes but is not limited to the component that contains a call site. A call site includes but is not limited to the location in the component where a call to another component occurs. A callee includes but is not limited to the operation that is invoked. From this control flow, an analyzer rule can produce a data flow.

In some examples, program code (executing on one or more processors) can also provide descriptions in a model which indicate where and how an element of a threat model was determined. For example, program code (executing on one or more processors) can provide a location in source code which corresponds to the source of a data flow. In this way, the persisted model can be used by another system or method to verify security properties of the system under analysis.

In one embodiment, program code (executing on one or more processors) can record a data flow, determine that it has crossed a trust boundary, record the outgoing properties of the data flow (including but not limited to whether or not it was encrypted) and provide the location of the code where these facts were discovered for analysis by another tool.

As discussed above, not all facts are elements of threat model. For example, a fact may not confirm that the associated element of a threat model exists in the received artifacts of a system architecture. In this case, a fact can be associated with a confidence score which indicates the likelihood that the fact is confirmed. A confidence score can be stored as a floating-point value in a data structure, for example, as a value in the same data structure as a fact. A confidence score can be calculated by ascertaining the confidence score of other facts. A confidence score can be derived from a rule definition. A confidence score can be used to determine how to cluster components or how strongly coupled components can be. In one embodiment, the present system uses a confidence score to inform the addition of threat model elements to the threat model.

In some examples, the sensitivity of the identification of the elements of the threat model is dependent upon the quality of the rules. The specificity of the identification of the elements of the threat model is dependent upon the quality of information that can be gleaned from the artifact.

In a non-limiting example, program code (executing on one or more processors) can determine by analysis of a code project configuration that a first component depends on a second component. The confidence score that the second component is used by the system may be 5.0 on a scale 0.0-10.0 where the higher score indicates a higher confidence. However, a source code artifact provided after the initial analysis may indicate that the second component is included with the project but is not called or otherwise utilized. In this case, the confidence score may be adjusted to indicate a low confidence that the second component is used by the first component.

In some embodiments, program code (executing on one or more processors) can produce an event and post it to a communication bus indicating that the dependency not used. If the source code artifact indicates that the first component is called or otherwise used, the confidence score can be increased to 7.5.

Program code (executing on one or more processors) can therefore have confidence that the second component is in use by the first component. Program code (executing on one or more processors) can then determine that the first component communicates with the second component. If a Role of the second component has been determined, program code (executing on one or more processors) can then conclude the component exhibits a trait associated with that role. For example, if the second component has been determined to be a logging API, the program code (executing on one or more processors) can infer that the first component exhibits a logging trait because it directly utilizes the second component. This trait can be used in comparison with a specified ideal model (where there are limited or no security concerns).

In addition to identifying or inferring the elements of the threat model from the facts of a system architecture, the program code (executing on one or more processors) can infer properties of the elements of the threat model. In a non-limiting example, the program code (executing on one or more processors) can use facts to infer a common name for an element of a threat model. A common name of a threat model component, for example, may be based on a host name, path, file name, namespace, class name, method name, parameter, schematic, layout, photographic image, or other attributes. In a non-limiting example, the process of naming is implemented by one or more rules stored in a database. In a non-limiting example, the program code (executing on one or more processors) can use facts to infer the role and/or capabilities of an element of a threat model. To illustrate role inference, consider that HTTP traffic (including but not limited to HTTP network traffic or common log) often reveals properties about the actors involved in an exchange. For example, an HTTP response header may reveal that the application has made a request to an AWS service. The HTTP session may reveal properties of the application or AWS service that were not previously recorded as facts by the present system. For example, the HTTP client may connect to the AWS S3 service. Program code executing on one or more processors can then include the S3 service in the threat model as an external entity. HTTP cookies or headers may also reveal entity information that can be incorporated into a model. For example, cookies may reveal the development platform used by a remote server. This information can be used to help inform the determination of role. In a non-limiting example, the present system uses facts to infer the properties of trust boundaries. To further the HTTP example above, a cross-domain script includes a higher-risk trust boundaries than a same-origin request does. This fact can be incorporated into the facts recorded about the received system architecture.

In one embodiment, program code executing on one or more processors can receive source code implemented in C++. An analysis plugin can perform a static analysis on the source code, producing a parse tree. The analysis plugin can then extract a series of facts pertaining to a threat model element from the parse tree, using rules stored in a second database. These facts can include that the source code represents a system process which listens on the network on a known port.

Program code executing on one or more processors can then receive a network trace in the "pcap" format. An analysis plugin can perform a parsing operation to extract all data flows from the network trace as facts of a system architecture. One of these facts can represent a flow from a previously unknown source to the system process listening on the known port.

Another analysis plugin can then use this fact to generate threat model elements. These threat model elements can include a component representing the source, the data flow between the source and the system process, and a trust boundary between the source and the system process; which are stored in a threat model data structure.

Program code executing on one or more processors can also receive a process trace which indicates the system process listens on the known port and also accesses a file on the file system. The confidence score pertaining to the system process listening port may then be adjusted, the threat model data structure may be updated to include a new threat model component to represent the file identified in the process trace, and the threat model data structure may be updated to include a new trust boundary between system process and the file.

The program code (executing on one or more processors) can broadcast an event to a communication bus indicating that an artifact performs an operation that could not be confirmed by the present invention to be valid. For example, Program code executing on one or more processors can publish an event to a notification queue indicating that a file access was discovered but could not be confirmed through the provided source code, indicating that the program code (executing on one or more processors) has not received complete set of artifacts (including but not limited to source code). This can cause the present system to notify an operator of missing artifact(s) or cause the present system to acquire the missing artifact(s) if it is able to resolve which artifact is missing, where it is located, and if it can be processed. Program code executing on one or more processors can then receive a directory listing which includes file permissions of the file referenced in the received process trace and determine that no further updates to the threat model data structure are necessary. The threat model may then be persisted to a structured file for further analysis by an external process.

In the one embodiment, the program code (executing on one or more processors) can receive an archive containing a source code project. In this example, a first process invokes a first parser based on a rule in a first database which identifies the extension of the archive as being handled by the first parser. The first analysis component determines the types of files in the archive and extracts them to a directory shared with other parsers. The first analysis component then communicates via a shared message pipeline to indicate the availability of the extracted artifacts. A series of subsequent analysis components are invoked based on the types of files that were extracted. A second analysis component examines the extracted files to identify the programming languages used in the project. A third analysis component identifies source code and build files for one language, parses them, and stores the parse trees in a second database. A fourth analysis component identifies source code and build files for a second language, parses them, and stores the parse trees in the second database. A fifth analysis component infers the platforms on which the application implemented by examining the files in the archive and stores this information in the second database. A sixth analysis component uses the information stored in the second database to generate a threat model.

In the one embodiment, Program code executing on one or more processors can receive an HTML document containing an HTML Form and source code of the controller which handles the form submissions. A first process identifies the fields submitted through the form and correlates each entry with the corresponding controller code that handles the form submission. The first process stores the relation between the form and the controller code as a fact in a database.

In some embodiments, Program code executing on one or more processors can infer a single sign-on data flow by identifying the role of each component in a data flow and store this inference (along with any associated data) as a fact. This can occur by but is not limited to occurring by observing the inclusion of a library which is known to support SSO functionality, observing the system under analysis interacting with the library by observing a call site via source code analysis or instrumentation output, and/or observing network traffic between resources which can be known addresses (e.g., URLs) of site which are known to support SSO.

In some embodiments, program code (executing on one or more processors) can apply traits to a model of an interaction between components. For example, it can be determined that a first component depends on a logging API and that the component uses the methods exposed by the logging API. Program code executing on one or more processors will therefore make a determination indicating confidence that the logging API is in use by the first component. Program code executing on one or more processors can also determine that a second component communicates with the logging API. Program code executing on one or more processors can then infer that the second component exhibits a logging trait.

In some examples, the program code enables a user of a system implementing aspects of the present invention to update the role using the difference between the original role value and the new role value to influence future role determinations by the system.

In some examples, the program code generates a notification and published the notification to a shared communication channel or endpoint when criteria have been met in accordance with rules stored in a database. For example, the program code can generate an alert when elements of a threat model are discovered or changed and no corresponding markup to identify the element has been added to a common artifact. The common artifact may include but is not limited to source code.

In some examples, program code executing on one or more processors can insert markup to a common artifact to identify and/or describe the elements of a threat model. The artifact document may include but is not limited to source code.

In some examples, program code executing on one or more processors can generate and position a representation of an element of a threat model on a graph. The program code can determine a placement of a trust boundary by correlating the source of a data flow (which may include but is not limited to including a source code, file, project, component, or system call) with the sink of a data flow (which may include but is not limited to including a destination file, project, component, or system call) and the trust level of each. The risk score of a boundary can influence the placement operation.

In some examples, the program code parses source code to identify version numbers using a plurality of methods across one or more properties of a software or hardware package or types of artifact contained in or a software or hardware package.

In some examples, the program code executing on one or more processors can perform a role detection of an element of a threat model.

In some examples, program code executing on one or more processors can identify one or more components of the system under analysis that are of security relevance and require additional inspection (akin to a heat map).

In some examples, program code executing on one or more processors can identify code which reduces to a set of instructions or properties which are equivalent to another set of instructions or properties.

In some examples, program code executing on one or more processors can indicate one or more components of the system under analysis where untrusted input is being provided to a system under analysis. This may be used to indicate areas for fuzzing.

In some examples, program code executing on one or more processors can implement a method to determine how the system under analysis differs from a system or model without the identified threats or security risks.

In some examples, program code executing on one or more processors can indicate that the run-time user account which the Web process is running under has not yet been collected, and through a log or other user interface, suggest it can be acquired. The configuration of the machine hosting the Web process may then be collected which can be used to identify the user the Web process is running as.

In some examples, the program code can automatically update an existing threat model based on changes in information. For example, the program code can augment, refine, and/or update a model when provided with additional artifacts related to the computer-implemented architecture already modeled. For example, if a call to a network socket function is discovered in a source code artifact, the disclosed system and method will record the properties of the call site along with the call parameters as evidence of a threat model element. This evidence alone is used to infer a data flow between the component from which the source code originated and a second component identified by the call parameters. If evidence is discovered elsewhere in a source code artifact which indicates the network socket identified will use TLS, the system and method will update threat model element to account for this discovery. Likewise, if a configuration file is provided to the system and method which associates a data flow with credentials, the system can update the threat model element to account for this discovery. In another example, if a firewall configuration rule provided to the system and method as an artifact of a system architecture indicates that a data flow is not possible, any evidence of a data flow affected by the firewall rule can be denoted as such. If a network packet capture provided to the system and method as an artifact of the system architecture indicates that no data matching the data flow has been sent, this will be used by the system and method to confirm the feasibility of the data flow.

In some examples, the program code can record the elements of a threat model in source code or in a log; allowing for example, the elements of a threat model to be analyzed for threats by another system. Furthermore, in some embodiments the program code determines the placement of the elements of a threat model in a coordinate system.

In some examples, the program code can monitor one or more streams of data, including but not limited to network data capture or program trace output. The program code can monitor one or more executions of a program to collect evidence of an element of a threat model. The program code can monitor one or more properties of a system on which the artifacts of the computer-implemented architecture are known to originate and/or reside to collect evidence of an element of a threat model.

In some examples, the program code captures statistics about changes made to a threat model and publishes notifications when changes are made to a component based on a set of defined indicators.

Embodiments of the present invention include computer-implemented methods, computer program products, and computer systems where program code executing on one or more processors obtains an artifact of a given computing system. The program code determines, based on applying rules, a type for the artifact. Based on the type, the program code designates a given analysis tool from a plurality of analysis tools, to process the artifact. The program code processes the artifact, utilizing the given analysis tool, to determine one or more facts of the artifact. The program code determines which facts of the one or more facts comprise elements of a threat model. The program code stores the elements of the threat model and the one or more facts. The program code generates a threat model for the given computing system, based on consolidating the elements of the threat model for the artifact with additional elements of the threat models of additional artifacts.

In some examples, the program code processing of the artifact comprises: the program code determining actors of the given computing system. The program code determines data handled by the given computing system. The program code determines entry points to and exit points of the data handled by the given computing system, wherein the actors, the data handled, the entry points, and the exit points comprise facts.

In some examples, the program code determines the entry points and the exit points comprises by determining trust boundaries traversed by the data handled.

In some examples, the given analysis tool is selected from the group consisting of: an analyzer, a parser.

In some examples, the utilizing the given analysis tool comprises applying at least one pre-configured rule.

In some examples, the artifact is selected from the group consisting of source code, binary code, configuration, network capture, network stream, process trace, process memory, tool output, instrumentation stream, directory listing, permission listing, and system model.

In some examples, designating the given analysis tool from the plurality of analysis tools, to process the artifact comprises: the program code publishing a notification identifying the artifact and comprising the type of the artifact.

In some examples, the artifact comprises at least one element selected from the group consisting of: data of a document, a stream, an image, and metadata of the given computing system In some examples, the artifact comprises the data of the document, where the document comprises at least one element selected from the group consisting of: configuration, inventory, source code, an intermediate file, an executable file, an instruction, a build file, a log file, a tool output, a process trace, instrumentation data, a communication bus capture, a memory capture, a bill of materials, a schema, a schematic, a hardware description language, a layer, a netlist, a printed circuit board design, and a layout file.

In some examples, the artifact comprises a stream, where the stream comprises at least one element selected from the group consisting of: network data, communication bus data, instrumentation data, and signals sent to or from a component of the given computing system.

In some examples, the artifact comprises metadata, wherein at least one element of the metadata is selected from the group consisting of: file-system permissions, host operating characteristics, parameters, design elements, layouts, other configuration, and declarations.

In some examples, the program code automatically implements a threat mitigation action in the given computing system, based on the threat model for the given computing system.

In some examples, the threat mitigation action is selected from the group consisting of: generating and displaying a graphic representation of at least one element of the elements in a graphical user interface, issuing a command to reconfigure a component of the given computing system, and generating and transmitting an alert to an administrator of the given computing system, generating metadata and causing the metadata to be implemented into the artifact, identifying a security posture, and determining a connection between the artifact and at least one additional artifact.

In some examples, processing the artifact to determine the one or more facts of the artifact comprises: the program code utilizing a machine-learning model generated by training one or more machine-learning algorithms, to identify elements of a threat model.

In some examples, the program code trains the one or more machine-learning algorithms, wherein the training comprises: the program code obtaining input from an operator or a log (e.g., a database), the input selected from the group consisting of: actions, instructions, and configurations. The training also includes the program code utilizing the input as training data to train the one or more machine-learning algorithms. The training also includes the program code generating the machine-learning model from the trained one or more machine-learning algorithms.

Figure 7:
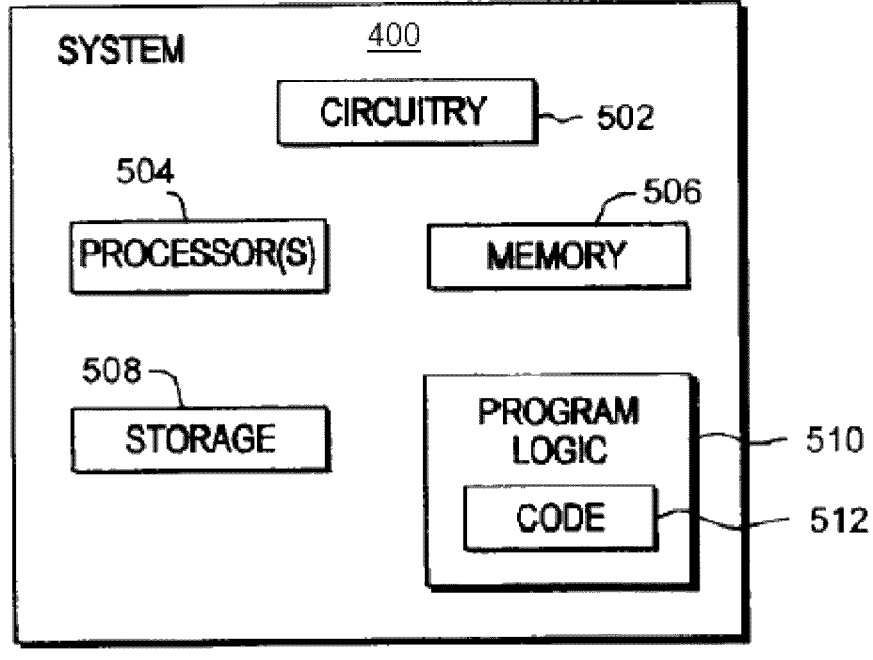
FIG. 7 depicts a computer system configured to perform an aspect of an embodiment of the present invention.

FIG. 7 illustrates a block diagram of a resource 400 in computer system, such as, which is part of the technical architecture of certain embodiments of the technique. For example, a resource 400 could be connected to or included in the modems utilized in various embodiments of the present invention to send and receive the additional signal over the legacy bus. Additionally, certain buses that can be utilize in embodiments of the present invention are themselves computing resources 400. Returning to FIG. 7, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

Figure 8:
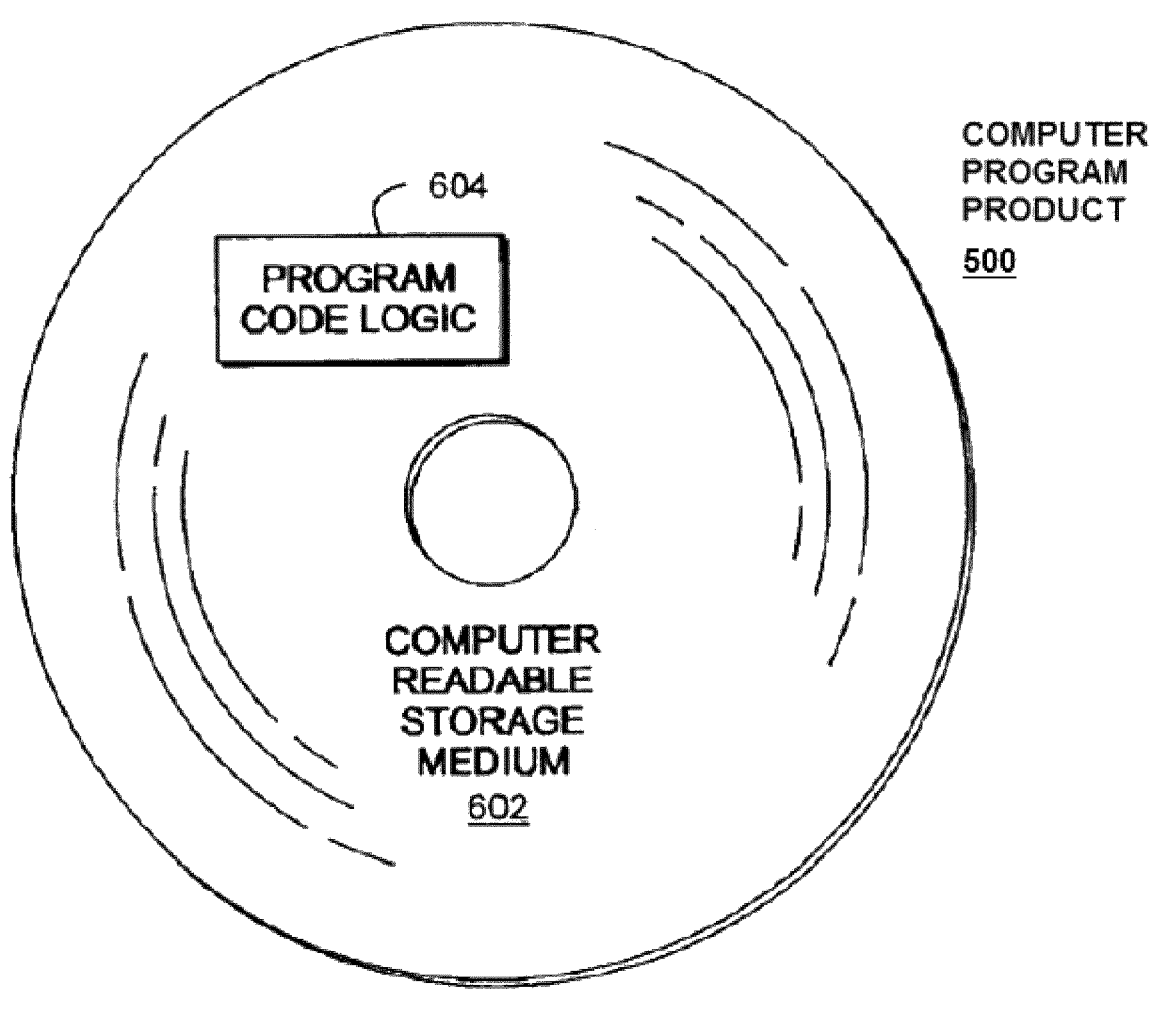
FIG. 8 depicts a computer program product incorporating one or more aspects of the present invention.

In certain embodiments, the program logic 510 including code 512 may be stored in the storage 508, or memory 506. In certain other embodiments, the program logic 510 may be implemented in the circuitry 502. Therefore, while FIG. 8 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Using the processing resources of a resource 400 to execute software, computer-readable code or instructions, does not limit where this code can be stored. Referring to FIG. 8, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method, or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Python, Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally, or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A system for automated threat modeling, comprising:
    a memory; and
    one or more processors in communication with the memory, wherein the computer system is configured to perform a method, said method comprising:
    ingesting, by the one or more processors, one or more compiled binary artifacts from a computing system, wherein the binary artifacts are selected from the group consisting of: executable files, shared object libraries, container images, firmware, compiled microservices, and other artifacts;
    performing, by the one or more processors, at least one analysis on the binary artifacts, wherein the at least one analysis comprises at least one of:
    performing, by the one or more processors, a static analysis on the binary artifacts to extract values; and
    executing, by the one or more processors, the binary artifacts to perform a dynamic analysis to capture interactions;
    generating, by the one or more processors, a dependency graph based on results of the at least one analysis static analysis, wherein the dependency graph represents internal and external component interactions;
    utilizing, by the one or more processors, the dependency graph to automatically identify and label trust boundaries and potential threat surfaces; and
    based on identifying the trust boundaries and potential threat surfaces, deriving, by the one or more processors, a structured threat model comprising a representation of a threat landscape of the computing system.

2. The system of claim 1, wherein the values are selected from the group consisting of: functions, symbols, imported libraries, and internal dependencies.

3. The system of claim 1, wherein the interactions are selected from the group consisting of: runtime interactions, system calls, network connections, and data flows.

4. The system of claim 1, wherein the at least one analysis comprises executing the binary artifacts and executing the binary artifacts comprises executing the binary artifacts within an instrumented runtime environment.

5. The system of claim 1, wherein the at least one analysis comprises and wherein the dynamic analysis comprises:

observing, by the one or more processors, computing elements or interactions selected from the group consisting of: runtime network connections, inter-process communications, and access to sensitive system resources.

6. The system of claim 1, wherein the structured threat model output comprises a data flow diagram (DFD), and wherein the DFD indicates data ingress, egress, and storage points.

7. The system of claim 1, wherein automatically identifying the trust boundaries comprises:

analyzing, by the one or more processors, the dependency graph to identify a presence of an event from a group of pre-defined events.

8. The system of claim 7, wherein the group of predefined events comprise: a change in privilege level, a change in authentication context, a crossing of a network or process isolation, and a crossing of another boundary.

9. A computer-implemented method for automating threat modeling of a computing systems, comprising:

ingesting, by one or more processors, one or more compiled binary artifacts from the computing system, wherein the binary artifacts are selected from the group consisting of: executable files, shared object libraries, container images, firmware, compiled microservices, and other artifacts;

performing, by the one or more processors, at least one analysis on the binary artifacts, wherein the at least one analysis comprises at least one of:

performing, by the one or more processors, a static analysis on the binary artifacts to extract values; and executing, by the one or more processors, the binary artifacts to perform a dynamic analysis to capture interactions;

generating, by the one or more processors, a dependency graph based on results of the at least one analysis, wherein the dependency graph represents internal and external component interactions;

utilizing, by the one or more processors, the dependency graph to automatically identify and label trust boundaries and potential threat surfaces; and based on identifying the trust boundaries and potential threat surfaces, deriving, by the one or more processors, a structured threat model comprising a representation of a threat landscape of the computing system.

10. The method of claim 9, wherein the structured threat model comprises trust boundaries, sensitive operations, and attack surfaces.

11. The method of claim 9, further comprising:

visualizing, by the one or more processors, the structured threat model in an interface of the computing system.

12. The method of claim 9, further comprising:

automatically analyzing, by the one or more processors, the structured threat model; and based on the automatically analyzing, implementing, by the one or more processors, a configuration change in the computing system.

13. The method of claim 9, wherein deriving the structured threat model comprises:

automatically classifying, by the one or more processors, the interactions according to standard security framework.

14. The method of claim 10, wherein sensitive operations are selected from the group consisting of: cryptographic functions, authentication checks, authorization checks, and access control logic.

15. The method of claim 9, further comprising:

annotating, by the one or more processors, a portion of the binary artifacts and a portion of the structured threat model with metadata indicating security-relevant findings.

16. A computer program product for automating threat model generation, the computer program product comprising:

one or more computer readable storage media and program instructions collectively stored on the one or more computer readable storage media readable by at least one processing circuit to:

ingest one or more compiled binary artifacts from a computing system wherein the binary artifacts are selected from the group consisting of: executable files, shared object libraries, container images, firmware, compiled microservices, and other artifacts;

perform at least one analysis on the binary artifacts, wherein the at least one analysis comprises at least one of:

perform a static analysis on the binary artifacts to extract values; and execute the binary artifacts to perform a dynamic analysis to capture interactions;

generate a dependency graph based on results of the at least one analysis, wherein the dependency graph represents internal and external component interactions;

utilize the dependency graph to automatically identify and label trust boundaries and potential threat surfaces; and based on identifying the trust boundaries and potential threat surfaces, derive a threat model comprising a representation of a threat landscape of the computing system.

17. The computer program product of claim 16, wherein the threat model is of a characteristic selected from the group consisting of: structured, visual, human readable, and machine-readable.

18. The computer program product of claim 16, wherein the threat model further represents a security posture of the computing system.

19. The computer program product of claim 16, wherein the interactions comprise runtime behaviors, and wherein the program instructions are further readable to: identify the runtime behaviors through instrumentation techniques, wherein the instrumentation techniques are selected from the group consisting of: tracing and memory introspection.

* * * * *